US012572434B2

(12) United States Patent
Schreter

(10) Patent No.: US 12,572,434 B2
(45) Date of Patent: Mar. 10, 2026

(54) DISASTER RECOVERY USING INCREMENTAL DATABASE RECOVERY

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 121 days.

(21) Appl. No.: 18/352,548

(22) Filed: Jul. 14, 2023

(65) Prior Publication Data

US 2025/0021452 A1     Jan. 16, 2025

(51) Int. Cl.
*G06F 11/20*     (2006.01)
*G06F 11/14*     (2006.01)
*G06F 11/1446*     (2026.01)
*G06F 16/27*     (2019.01)

(52) U.S. Cl.
CPC ...... *G06F 11/2028* (2013.01); *G06F 11/1464* (2013.01); *G06F 11/1469* (2013.01); *G06F 16/273* (2019.01); *G06F 2201/80* (2013.01)

(58) Field of Classification Search
CPC .............. G06F 11/2028; G06F 16/273; G06F 11/1469; G06F 11/1464; G06F 11/1448; G06F 11/1451; G06F 11/203; G06F 2201/80; G06F 11/2094; G06F 16/278
See application file for complete search history.

(56) References Cited

U.S. PATENT DOCUMENTS 7,246,207 B2 *   7/2007   Kottomtharayil ... G06F 16/2228
                                                     711/111
10,838,821 B2 *   11/2020   Bhagi ................... G06F 16/156

10,853,194 B1 *   12/2020   Certain ............... G06F 11/1471
11,099,956 B1 *   8/2021   Polimera ............. G06F 9/45558
11,232,000 B1 *   1/2022   Bhatia ................. G06F 11/1464
2014/0046900 A1 *   2/2014   Kumarasamy ...... G06F 11/1489
                                                     707/620

(Continued)

OTHER PUBLICATIONS

Commvault 2022E Documentation. Datasheet [online]. CommVault Systems Inc., 2024 [retrieved on Dec. 19, 2024]. "Moving a SQL Server Database" Retrieved from the Internet: <URL: https://documentation.commvault.com/2022e/expert/moving_sql_server_database.html>. (Year: 2024).*

(Continued)

*Primary Examiner* — Ashish Thomas
*Assistant Examiner* — Bryan P Huang
(74) *Attorney, Agent, or Firm* — Buckley, Maschoff & Talwalkar LLC

(57)     ABSTRACT

Systems and methods include storage of shards of first database tables of a first tenant in a first plurality of storage nodes located in a first region, each shard associated with a first database table and a key range of the first database table, storage of shards of second database tables of a second tenant in a second plurality of storage nodes located in a second region, each shard associated with a second database table and a key range of the second database table, storage of backups of the shards of the first database tables of the first tenant in a plurality of backup locations located in a region different from the first region, and recovery of the backups of the shards of the first database tables of the first tenant from the backup layer to the second plurality of storage nodes.

20 Claims, 25 Drawing Sheets

(56) References Cited

U.S. PATENT DOCUMENTS

| | | | |
|---|---|---|---|
| 2014/0201161 A1* | 7/2014 | Kumarasamy | G06F 11/1469 |
| | | | 707/679 |
| 2016/0124818 A1* | 5/2016 | Wang | G06F 11/1451 |
| | | | 714/4.12 |
| 2019/0087282 A1* | 3/2019 | Kumar | G06F 16/14 |
| 2021/0173945 A1* | 6/2021 | Karr | G06F 3/065 |
| 2022/0179761 A1* | 6/2022 | McAuliffe | G06F 11/2094 |
| 2023/0099014 A1* | 3/2023 | Sagiraju | G06F 11/1464 |
| | | | 714/6.12 |

OTHER PUBLICATIONS

Commvault Runbook. Datasheet [online]. Coast Community College District, 2019. Retrieved from the Internet: <URL: https://research.gwchb.net/wp-content/uploads/2019/01/Computer_systerms_backup_CCCD.pdf>. (Year: 2019).*

Pan, Trista Juan. 'How sharding a database can make it faster'. In Stack Overflow Blog [online]. Mar. 14, 2022 [retrieved Dec. 31, 2024]. Retrieved from the Internet: <URL:https://stackoverflow.blog/2022/03/14/how-sharding-a-database-can-make-it-faster> (Year: 2022).*

* cited by examiner

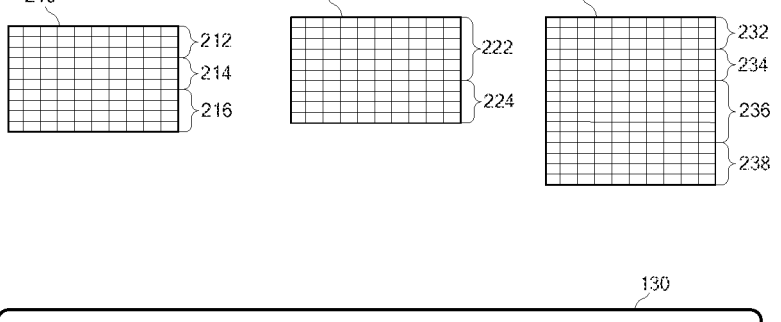
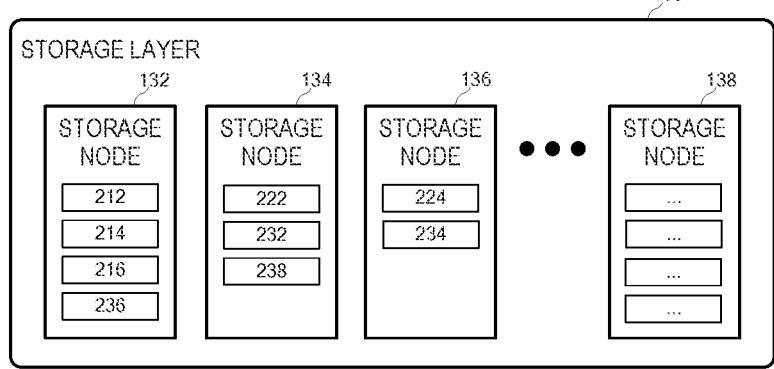
FIG. 2

400

S410

Receive Request For Location Of Database Table
Shard From Database Frontend

S420

Determine Storage Node Storing Database Table
Shard From Stored Metadata

S430

Provide Identifier Of Determined Storage Node To
Requestor

S440

Receive Operation On Database Table Shard
Stored On Determined Storage Node

1500

S1510

Receive Request To Recover Database Tables To
Database System

S1520

Determine Backup Locations Storing Backups Of
All Database Table Shards

S1530

From Each Backup Location, Recover The
Database Table Shards To A Storage Node

S1540

Replicate Each Recovered Database Table Shard
To Two Or More Other Storage Nodes

1700

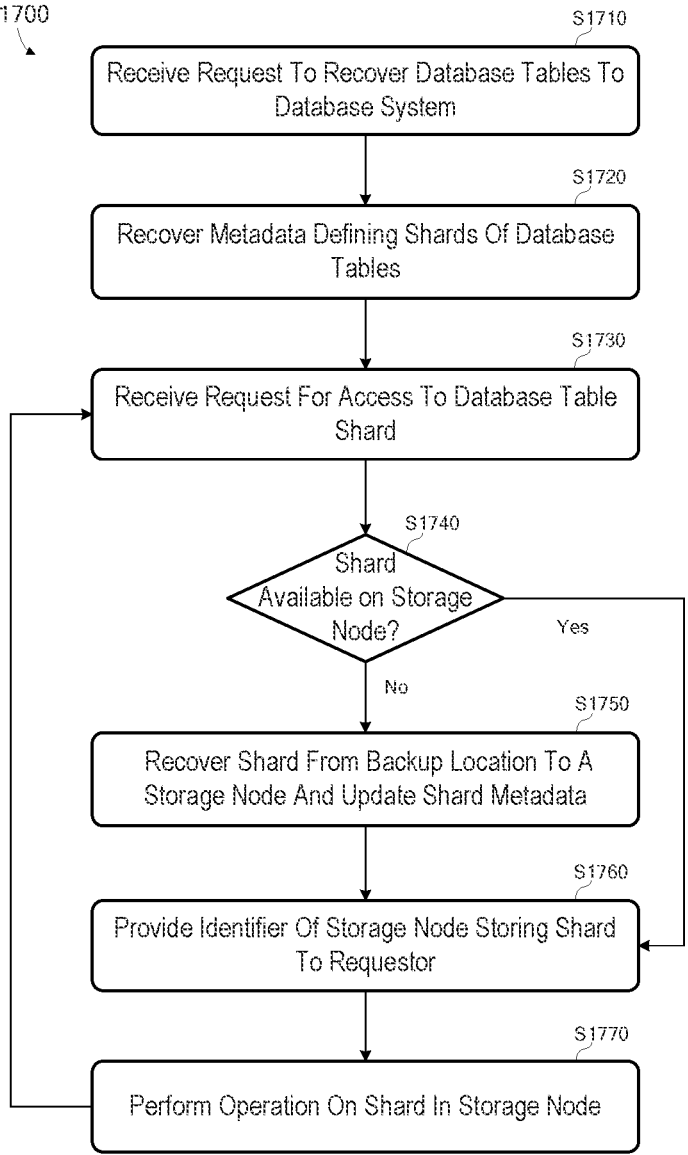

S1710
Receive Request To Recover Database Tables To Database System

S1720
Recover Metadata Defining Shards Of Database Tables

S1730
Receive Request For Access To Database Table Shard

S1740
Shard Available on Storage Node?

Yes

No

S1750
Recover Shard From Backup Location To A Storage Node And Update Shard Metadata S1760
Provide Identifier Of Storage Node Storing Shard To Requestor S1770
Perform Operation On Shard In Storage Node

FIG. 17

DISASTER RECOVERY USING INCREMENTAL DATABASE RECOVERY

BACKGROUND

Modern organizations often utilize a system landscape consisting of distributed computing systems providing various computing services. For example, an organization may deploy services within computing systems located in on-premise data centers (which themselves may be located in disparate geographic locations) and within data centers provided by one or more Platform-as-a-Service (PaaS) providers. The computing systems may comprise cloud-based computing systems (e.g., providing services using scalable-on-demand virtual machines).

In a Software-as-a-Service (SaaS) model, a service provider deploys a service (e.g., a database) onto cloud-based computing systems (which may in some instances be provided by a separate PaaS provider). The service may be used by a customer in exchange for payment of a fee to the service provider. The customer is not involved with the operation, management or scaling of the service, all of which are performed by the service provider.

In the case of a database provided "as a service", a service provider would like to ensure scalability on both the storage and the compute layers of the database. Some deployments disaggregate the storage and the compute layers by utilizing a separate cluster of nodes for each layer. This disaggregation (theoretically) allows independent scaling of each of the layers.

The storage layer of such a database service may consist of many storage nodes, each of which contains local disk space and computing resources (e.g., RAM and CPU) to execute a storage node process. The database service may be a single-tenant system in which all of the storage nodes of the storage layer in combination store a single database. Since a tenant requires a separate tenant-specific storage layer in such implementations, these systems are cost-prohibitive for a small tenant. For larger tenants, the elasticity of such systems is unsuitable since the addition or deletion of individual storage nodes does not provide suitably-fine scaling increments.

A distributed database system typically implements features intended to deal with potential technical failures. These features may compensate for individual node failures in the storage layer, and also for failures of an entire availability zone. However, some customers require recovery from more severe scenarios, such as when an entire region of availability zones is unavailable (e.g., due to a regional natural disaster).

Disaster recovery functionality may provide redundancy across regions for continuity in case of large-scale failures. Such functionality may include replication under a consensus protocol, in which data stored by a primary database instance in a primary region is replicated over a Wide Area Network (WAN) to one or more secondary database instances running in one or more different regions. Synchronous replication is typically not used due to prohibitive latency costs, therefore the one or more secondary database instances are updated asynchronously. Consequently, the one or more secondary database instances do not necessarily include an exact copy of all the data of the primary database instance at a given time.

If the primary region encounters a disaster, a replica database instance in a secondary region is activated manually and clients are directed to connect to this replica. Since the replica has been continuously fed updated data from the primary region and is already running, it can be brought online and serve clients extremely quickly. This feature entails significant cost since a full set of database resources must be reserved and operated in the primary region and each secondary region, effectively multiplying the costs of the database system by the number of secondary regions.

What is needed are systems to efficiently provide full-region disaster recovery while requiring significantly less resource consumption than current systems.

BRIEF DESCRIPTION OF THE DRAWINGS

FIG. 2 illustrates storage of database table shards on a plurality of storage nodes according to some embodiments.

FIG. 17 is a flow diagram of a process to incrementally recover database tables of a database system according to some embodiments.

DETAILED DESCRIPTION

Figure 1:
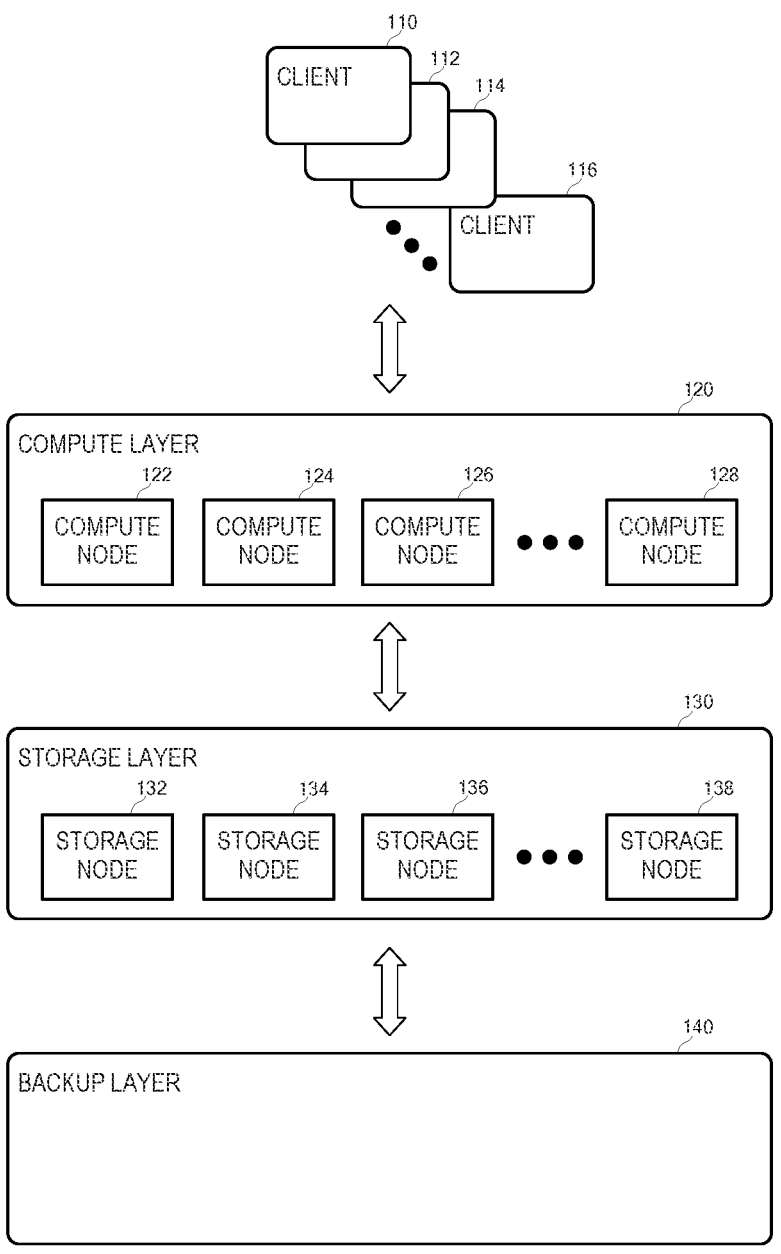
FIG. 1 illustrates a distributed database system according to some embodiments.

The following description is provided to enable any person in the art to make and use the described embodiments. Various modifications, however, will remain readily-apparent to those in the art.

According to some embodiments, the storage layer of a database system may store data of one or more tenants. The data of each tenant is logically split into shards and the shards of a given tenant are distributed across a plurality of storage nodes of the storage layer. The shards are large enough to amortize costs of operations on individual data items by allowing batch request processing, and small enough to allow suitably fast operations on entire shards (e.g., for backup/recovery, shard relocation). The shards may be substantially equally-sized and in the range of 1 GB-10 GB per shard in some embodiments.

Each shard stored on a storage node may be backed up to a backup layer implemented by an object storage service. The backup layer node may store backup data of one or more shards of each of one or more tenants. In one particular example, a system according to some embodiments may include a plurality of storage nodes which each store one or more shards of a given tenant, and a backup layer which stores the backup data of each of the shards of the given tenant in a separately-identifiable location.

According to some embodiments, a first database system executing in a first region serves a first one or more tenants. Backups of the shards of each tenant database are stored in the object store of a second region. In case of a disaster which disables the first region, an operator initiates recovery of the backed-up database shards of the first one or more tenants into a second database system which is executing in another region (e.g., the second region or a third region) and serving other tenants. User queries of the first one or more tenants are then directed to the second database system. Accordingly, fast recovery from a region-wide disaster may be provided to the first one or more tenants without requiring prior reservation of duplicate resources within the region of the second database system.

Recovery of the backed-up database shards may proceed by recovering all of the database table shards of the database tenant from determined backup locations to a plurality of storage nodes of the second database system. Assuming a 1 GB/s connection between a storage layer the second database system and the backup layer, some embodiments may complete the entire recovery process within seconds, particularly if the backup layer-to-storage node bandwidth is large in comparison to the size of shards backed up to a given backup location.

Some embodiments may also provide a recovery operation which allows near-instantaneous usage of the data to be recovered. According to this so-called incremental recovery operation, backed-up metadata defining the shards of the database tables is recovered to the storage layer of the second database system. The metadata may specify a tenant, a database table, a key range and a backup location associated with each shard. Recovery of the metadata may occur in less than one second.

Next, a request to access a shard of the first one or more tenant databases is received at the second database system from a database frontend associated with one of the first one or more tenants. It is first determined whether the shard is available within the storage layer of the second database system. Assuming that the shard is not available, the shard is recovered from the backup location associated with the shard in the metadata and the metadata is updated to specify the storage node in which the shard is now stored. An identifier of the storage node is provided to the database frontend, which uses the identifier to transmit a request to the storage node to perform an operation on the shard. Accordingly, using incremental recovery, shards are recovered "on demand" and are available for use almost instantaneously.

In order to ensure that the second region includes sufficient resources to recover tenants from other regions without requesting additional resources and without noticeably limiting the performance of its existing tenant databases, each storage cluster within a region may be instantiated with a margin of 25% free resources, although embodiments are not limited to this margin. Moreover, only a subset of tenants are expected to subscribe to region-wide disaster recovery features, due to additional costs and the region-specificity of many tenants. As a result, only a portion of the tenant data within a given region may be recovered to another region in case of a region-wide disaster.

The above-described incremental recovery operation may further reduce the large-scale workload resulting from a region failure. In particular, the use of incremental recovery may prevent the occurrence of a workload spike immediately after redirection of tenant queries to the new region and distribute the recovery workload over a larger timeframe as the individual shards are accessed within their respective tenant databases.

Embodiments may also distribute the workload caused by a failed region to multiple other regions. For example, a database system of a first region may store data of two database tenants. Upon failure of the first region, the backed-up database table shards of one of the database tenants may be recovered to a database system of a second region while the backed-up database table shards of the other one of the database tenants may be recovered to a database system of a third region. If the workload is distributed evenly among n regions, a failure of one region only increases the workload of each other regions by 1/n.

Embodiments may therefore provide full-region disaster recovery while requiring significantly less resource consumption than current systems.

FIG. 1 illustrates a database system according to some embodiments. The illustrated components of FIG. 1 may be implemented using any suitable combinations of computing hardware and/or software that are or become known. Such combinations may include cloud-based implementations in which computing resources are virtualized and allocated elastically. In some embodiments, two or more components are implemented by a single computing device.

Clients 110-116 may comprise computing systems executing applications or services which issue database queries. Clients 110-116 may issue the database queries in response to requests input thereto by users (not shown). Compute layer 120 receives the queries (e.g., via APIs provided by compute layer 120) and operates in conjunction with database data stored within storage layer 130 to provide corresponding query results to clients 110-116.

Compute layer 120 includes a plurality of compute nodes 122-128. Similarly, storage layer 130 includes a plurality of storage nodes 132-138. Each of nodes 122-128 and 132-138 includes at least one processing unit (e.g., a CPU), random access memory, and at least one data storage device (e.g., an NVMe SSD), and may comprise a single computer server, a group of computer servers, a virtual machine and any other combination that is or becomes known. In some embodiments, compute layer 120 is fully stateless and booted over the network, therefore compute nodes 122-128 are not required to include a storage device. Storage nodes 132-138 and compute nodes 122-128 may include spare processing and/or storage resources to support cross-region tenant recovery as described herein.

In some embodiments, compute layer 120 and storage layer 130 are implemented by Kubernetes clusters. Kubernetes is an open-source system for automating deployment, scaling and management of containerized applications. A Kubernetes cluster consists of many nodes, which in turn may comprise physical servers and/or virtual machines. A node executes an application within a software container. One or more containers may be grouped into a pod, where each container of a given pod shares the same computing resources and local network.

Backup layer 140 provides object storage to storage layer 130. Each storage node 132-138 of storage layer may store its block-based data as objects within backup layer 140. Backup layer 140 may provide object storage through a web service interface in some embodiments. Backup layer 140 may comprise an object store service provided by a hyperscaler (e.g., AWS S3). Storage layer 130 identifies backup data for a particular shard stored in layer 140 via an abstract backup location identifier. In some embodiments, the backup location identifier may comprise a composition of a corresponding tenant ID, shard ID and version counter.

According to some embodiments, FIG. 1 represents a single-tenant database system. Storage nodes 132-138 store data associated with a single tenant and compute nodes 122 handle queries received from clients 110-116 operated by users of the single tenant. Alternatively, storage nodes 132-138 store data associated with multiple tenants and compute nodes 122 handle queries received from clients 110-116 operated by users of the various tenants.

The tenant data is stored in shards which are distributed across storage nodes 132-138. Backup layer 140 may store backup data of each shard of storage nodes 132-138. In a case that storage nodes 132-138 store multiple replicas of each shard of the database, backup data of only one replica of each shard may be stored in backup layer 140.

Each of compute nodes 122-128 may execute a tenant-specific single-tenant database instance. Accordingly, in a case that client 110 is being accessed by a user of a first tenant, queries issued by client 110 are directed to the one of compute nodes 122-128 which is associated with the first tenant. In yet another example, each of compute nodes 122-128 executes a multi-tenant database instance. Accordingly, any of compute nodes 122-128 are capable of handling queries received from clients 110-116 regardless of the tenant whose data is being queried.

As described herein, the backup data of one or more tenant databases stored in backup layer 140 may be recovered to a database system located within a region other than the region which includes compute layer 120 and storage layer 130.

FIG. 2 illustrates storage of database table shards of a single tenant on a plurality of storage nodes according to some embodiments. Database tables 210, 220 and 230 are logical representations of data associated with a given database tenant. Database tables 210, 220 and 230 may conform to a particular schema as is known in the art. According to some embodiments, each row of each of database tables 210, 220 and 230 includes values describing an instance of an object. Embodiments are not limited to any types of objects.

Each of database tables 210, 220 and 230 is split into multiple shards. Specifically, database table 210 is split into shards 212, 214 and 216, database table 220 is split into shards 222 and 224, and database table 230 is split into shards 232, 234, 236 and 238. Each shard is associated with a key range. The shards may be substantially equally-sized and the size of each shard may be between 1 GB and 10 GB in some embodiments. Embodiments include any algorithm for splitting a table into shards and for defining the key ranges of the shards. In one implementation, storage layer 130 is a key/value store and the key range of a shard is the key range of stored keys in that shard. According to some embodiments, a shard may include data of more than one database tables.

According to the present example, the shards are stored across storage nodes 132, 134 and 136 of storage layer 130. Storage node 132 stores shards 212, 214, 216 and 236, storage node 134 stores shards 222, 232 and 238, and storage node 136 stores shards 224 and 234. It is assumed that storage node 138 and any other storage nodes of storage layer 130 store shards of other unshown database tables of the tenant.

The distribution of the shards across the storage nodes of storage layer 130 may be based on any suitable algorithm. Since storage node 132 stores all shards 212, 214, 216 of table 210, failure of node 132 results in inaccessibility of all of the data of table 210. In some embodiments, each shard of a table is preferably stored on a different node (e.g., shards 222 and 224 of table 220), such that failure of a node results in inaccessibility of at most one shard of the table. Some embodiments may store at most one shard of a given tenant per storage node.

Figure 3:
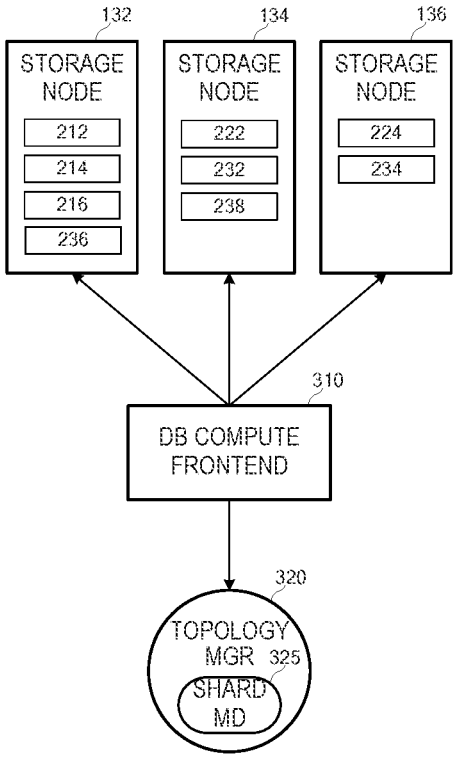
FIG. 3 illustrates access to database table shards according to some embodiments.

FIG. 3 illustrates access to database table shards according to some embodiments. Database compute frontend 310 may comprise a database instance executing on a compute node as described above. Database compute frontend 310 may need to access database table data in response to a query received from a client. However, due to the shard storage described above, database compute frontend 310 must initially determine the location of the shards containing the desired data in order to direct its requests to the appropriate storage node(s).

Topology manager 320 may consist of a storage node within a storage layer as described above. Topology manager 320 may store shard metadata 325 in the same manner as the other shards described herein. Shard metadata 325 may be associated with a well-known ID in the system to facilitate access thereto by database compute frontends.

According to some embodiments, shard metadata 325 specifies the storage locations of the database shards. For example, shard metadata 325 may identify each shard by a table ID and a key range. Each thusly-identified shard is also associated with an identifier of a storage node on which it is stored. Accordingly, database compute frontend 310 queries topology manager 320 for the location of the shards associated with a query (e.g., all shards of a given table) and receives in return an indication of the storage node(s) in which the desired shard(s) are stored. Database compute frontend 310 then issues database operations to the node(s) on which the shard(s) are stored. As described above, the operations may advantageously be performed in parallel if the shards are located on more than one storage node.

In some embodiments, shard metadata 325 is a system control shard which specifies the storage locations of root shards of each tenant in the database system. Creation of new tenant metadata in the system control shard causes creation and storage of a root shard which includes shard metadata associated with the tenant. Therefore, in response to a received query, database compute frontend 310 queries topology manager for the location of the root shard of the tenant associated with the query, retrieves the shard metadata from the root shard, and determines the storage node(s) in which the desired shard(s) are stored based thereon.

Figure 4:
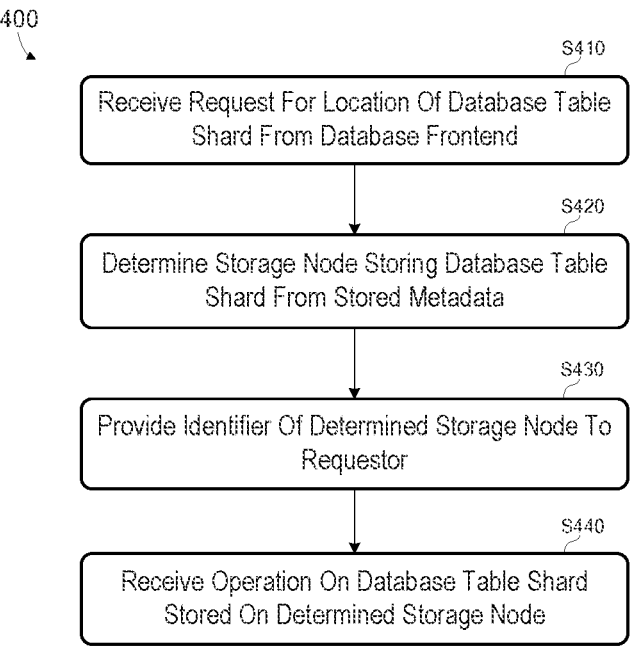
FIG. 4 is a flow diagram of a process to access database table shards on storage nodes according to some embodiments.

FIG. 4 is a flow diagram of process 400 to access database table shards on storage nodes according to some embodiments. Process 400 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Process 400 assumes the prior storage of database table shards on multiple storage nodes as described above. At S410, a request is received for the location of a database table shard. The request may identify the shard using a database table identifier and one or more primary keys (or a primary key range) of the identified table. The request is received from a database frontend, which may be executing on a compute node of a compute layer as described above. The identified shard may include data required to serve a query received from a client application by the database frontend.

In response to the request, a storage node storing the shard is determined based on stored metadata. According to some embodiments, the stored metadata is shard metadata stored by a topology manager as described above. Such a topology manager may therefore receive the request at S410 and determine the storage node based on the request and the shard metadata at S420. In one example, the request includes a database table identifier and a primary key range. The topology manager may determine a shard which includes the primary key range of the identified table based on the shard metadata at S420, and further determine a storage node storing the shard based on the shard metadata. In some embodiments, S420 includes determination of a root shard of a tenant associated with the query and determination of the storage node(s) in which the desired shard(s) are stored based on metadata stored in the root shard. An identifier of the determined storage node(s) is provided to the requestor at S430.

It may be determined at S420 that the primary key range spans two or more shards, in which case the storage nodes storing the two or more shards are determined at S420. In another example, the request includes only a table identifier and no primary keys or key range. Accordingly, S420 includes determination of all shards of the identified table and their corresponding storage nodes. The received request may include any number of table identifiers and associated key ranges.

A database operation on the shard is received at the database node on which the shard is stored at S440. The database operation may be issued by the database frontend from which the request was received at S410, and may utilize the identifier provided at S430. If more than one storage node has been identified, a database operation may be issued to and received at each other node at S440, thereby enabling parallel execution of the operations by the more than one storage nodes.

Figure 5A:
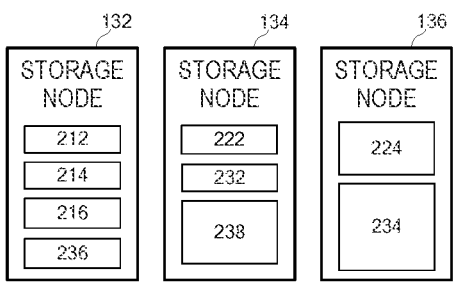
FIGS. 5a through 5c illustrate a scale-out process according to some embodiments.
Figure 5B:
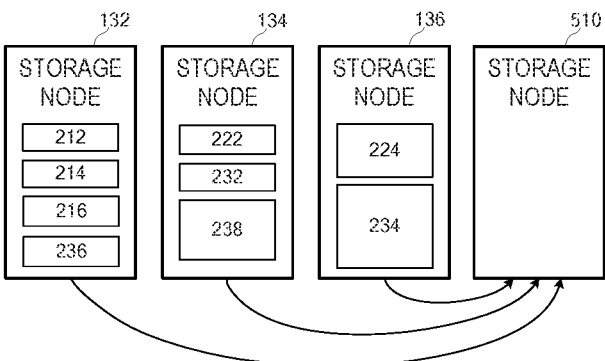
Figure 5C:
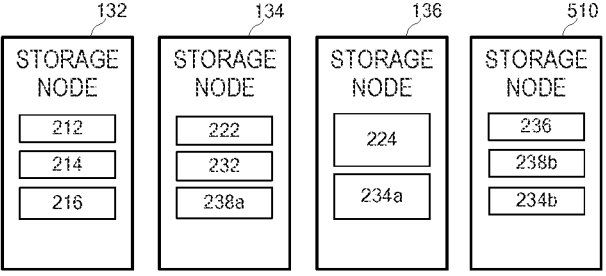

FIGS. 5*a* through 5*c* illustrate a scale-out process according to some embodiments. Storage nodes 132, 134 and 136 of FIG. 5*a* store respective shards, some of which have grown in size with respect to FIG. 3. It may therefore be manually or automatically (based on resource consumption parameters) determined to reduce the amount of storage consumed by one of the storage nodes by adding another storage node to the corresponding storage layer. Such a determination may be performed by a topology manager according to some embodiments. It may also or alternatively be determined to divide shards 234 and 238 because their size exceeds a specified maximum shard size.

FIG. 5*b* illustrates the addition of storage node 510 to the storage layer. FIG. 5*b* also illustrates the movement of shards from each of storage nodes 132, 134 and 136 to storage node 510. The movement may be intended to achieve load balancing which reducing the memory consumption per node.

FIG. 5*c* illustrates the resulting storage layer. As shown, shard 236 has moved from storage node 132 to storage node 510. Shard 238 has been divided into shards 238*a* and 238*b* and shard 238*b* has moved from storage node 134 to storage node 510. Similarly, shard 234 has been divided into shards 234*a* and 234*b* and shard 234*b* has moved from storage node 136 to storage node 510. Embodiments are not limited to division of a shard into equally-sized shards.

Advantageously, the shards moved to node 510 are each moved over different (and substantially independent) node-to-node network connections. Movement of the shards therefore may occur substantially faster than in a case where all three shards travel from a single node to node 510. Moreover, this movement only requires the nodes from which the shards are moved to use 1/n of their respective bandwidth. Consequently, impact on node performance and system response time is minimal.

Division of a shard and movement of the resulting shards may occur with or without the addition of a storage node. Addition of a storage node and movement of shards thereto may also occur with or without dividing any shards.

Figure 6A:
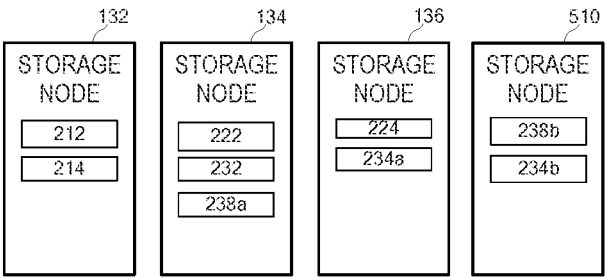
FIGS. 6a through 6c illustrate a scale-in process according to some embodiments.
Figure 6B:
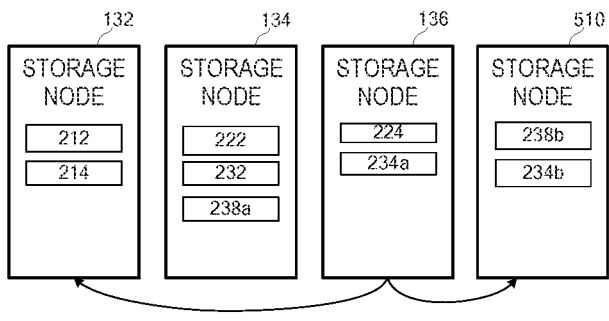
Figure 6C:
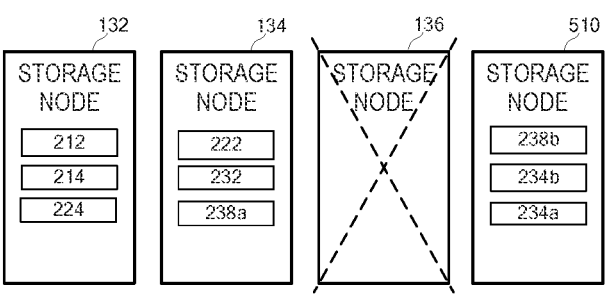

FIGS. 6*a* through 6*c* illustrate a scale-in process according to some embodiments. FIG. 6*a* illustrates storage nodes 132, 134, 136 and 138 in which some shards are smaller than shown in FIG. 5*c*. It may therefore be manually or automatically (again, based on resource consumption parameters) determined to reduce the number of storage nodes of the corresponding storage layer. This determination may be performed by a topology manager according to some embodiments.

In the present example, it is determined to decommission storage node 136. Accordingly, FIG. 6*b* illustrates the movement of the shards of storage node 136 to storage nodes 132 and 510. The storage nodes to which the shards are moved are determined so as to achieve load balancing in some embodiments.

FIG. 6c illustrates the resulting storage layer, in which shard 224 has moved from storage node 136 to storage node 132 and shard 234a has moved from storage node 136 to storage node 510. Storage node 136 no longer stores any shards and may therefore be decommissioned. According to some embodiments, scaling-in may also or alternatively include merging two or more small shards into one shard, and placing the one shard on a storage node based on load balancing and resource consumption considerations. Due to the key range associated with each shard, shards should only be merged with shards that are associated with an adjacent key range according to some embodiments.

Figure 7:
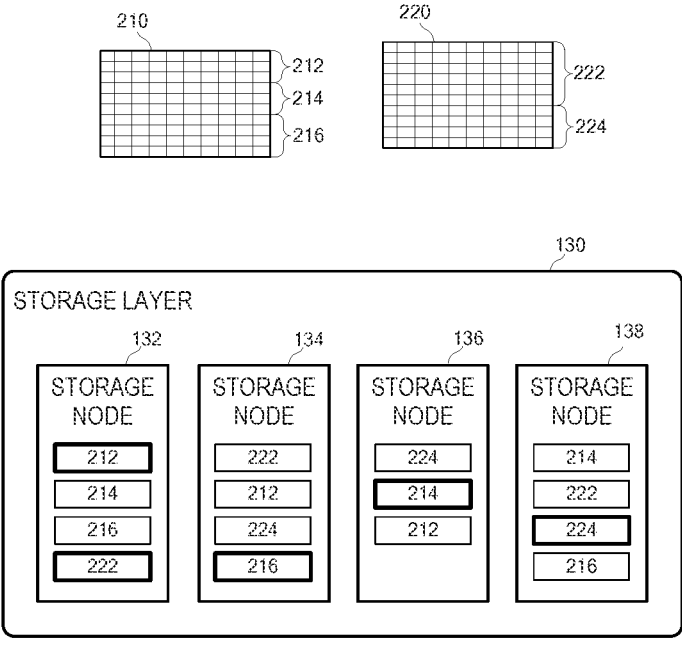
FIG. 7 illustrates storage of database table shard replicas on a plurality of storage nodes according to some embodiments.

FIG. 7 illustrates storage of database table shard replicas of a single tenant on a plurality of storage nodes according to some embodiments. As described with respect to FIG. 2, database tables 210 and 220 and 230 are logical representations of data associated with a given database tenant and are split into multiple shards associated with different key ranges.

As shown in FIG. 7, storage layer 130 store multiple replicas of each of shards 212, 214, 216, 222 and 224. Replication may be performed in any suitable manner such as by using a consensus protocol, employing erasure codings across replicas, etc., each of which may exhibit different advantages and disadvantages based on the use case. The distribution of the replicas across the storage nodes of storage layer 130 may be based on any suitable—algorithm which may provide load-balancing and high availability.

Although three replicas per shard are illustrated in FIG. 7, embodiments may utilize any number of replicas. In the case of a protocol which replicates each shard across three different storage nodes, the data of a particular shard remains fully accessible if one of the three storage nodes serving this shard fails or is decommissioned. If the replication factor is set greater than three, then the system continues normal operation even in the case of multiple node failures (e.g., two node failures using a replication factor of five, or in general k node failures with a replication factor of 2k+1).

FIG. 7 reflects a consensus protocol in which each shard is represented by a leader replica and two follower replicas. The leader replica is determined by a leader election algorithm and is denoted by a pronounced outline in FIG. 7. All operations on a given shard are directed to the storage node which stores the leader replica of the shard, and changes thereto are replicated to the follower replicas of the shard. If a node including a leader replica of a shard fails, one of the remaining follower replicas of the shard is designated the leader replica and the new leader replica begins to replicate its changes to the remaining follower replicas. Moreover, as will be described below, a new follower replica is quickly instantiated on another (or new) storage node to reestablish the desired consensus protocol.

Figure 8:
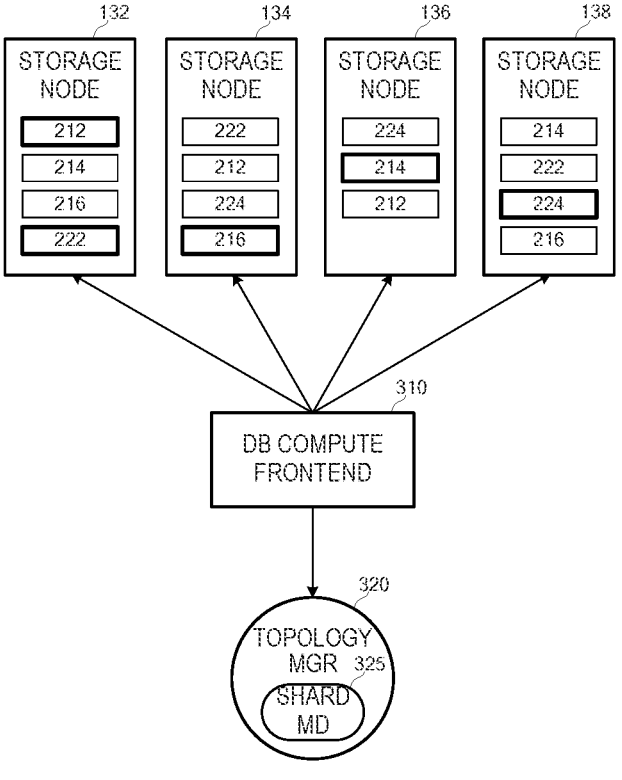
FIG. 8 illustrates access to database table shards according to some embodiments.

FIG. 8 illustrates access to leader replicas of shards according to some embodiments. Database compute frontend 310 determines the location of the leader replicas of shards containing the desired data in order to direct its requests to the appropriate storage node(s). Shard metadata 325 of topology manager 320 specifies the storage locations of all replicas of each shard and notes the current leader replica of each shard. If a storage node including a leader replica of a shard fails or is decommissioned, a new leader replica of the shard is elected and shard metadata 325 is updated accordingly. Any follower replicas stored on the failed/decommissioned storage node are removed from shard metadata 325. Shard metadata 325 also specifies a table ID and a key range of each shard.

Accordingly, database compute frontend 310 queries topology manager 320 for the location of the shards associated with a query (e.g., all shards of a given table) and receives therefrom an identifier of the storage node(s) in which the leader replicas of the desired shard(s) are stored. Database compute frontend 310 then issues database operations to the node(s) on which the leader replicas shard(s) are stored. Again, the operations may advantageously be performed in parallel if the shards are located on more than one storage node.

Database compute frontend 310 may also receive identifiers of the storage nodes in which the follower replicas of the desired shard(s) are stored. Accordingly, if an operation to an identified leader replica fails, database compute frontend 310 may seamlessly retry the operation on one of the corresponding follower replicas stored on a different storage node.

In some embodiments, a root shard stores shard metadata 325 instead of topology manager 320, and topology manager 320 merely stores the location of the root shard. The root shard may also be stored among storage nodes 132-138 in multiple replicas, in which case topology manager 320 stores the location of each replica.

Figure 9A:
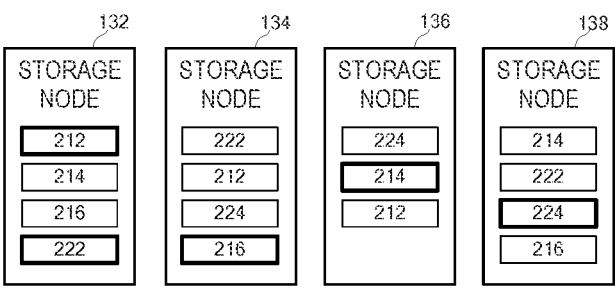
FIGS. 9a through 9c illustrate a scale-out process using database table shard replicas according to some embodiments.
Figure 9B:
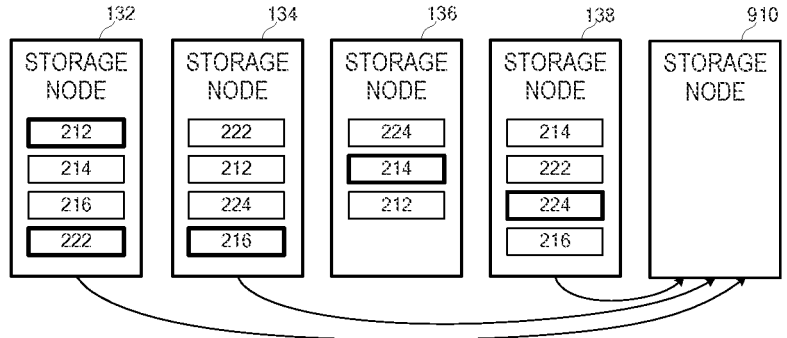
Figure 9C:
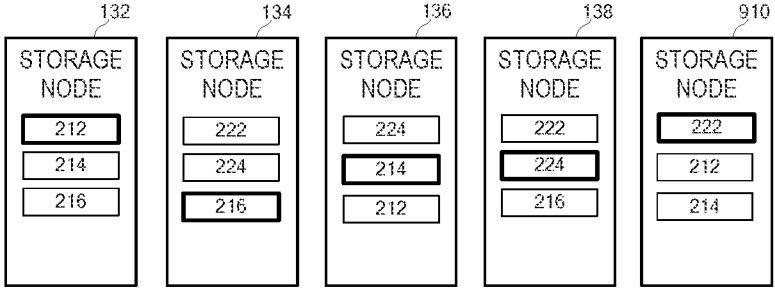

FIGS. 9a through 9c illustrate a scale-out process using database table shard replicas according to some embodiments. Storage nodes 132, 134, 136 and 138 of FIG. 9a store respective shards as shown in FIGS. 7 and 8. It will be assumed that it is manually or automatically determined to add another storage node to the corresponding storage layer to, for example, reduce the amount of storage consumed by one of the storage nodes or provide improved availability.

FIG. 9b illustrates the addition of storage node 910 to the storage layer. As also illustrated in FIG. 9b, shards are moved from each of storage nodes 132, 134 and 138 to storage node 910. FIG. 9c illustrates the resulting storage layer. Shard 222 has moved from storage node 132 to storage node 910, shard 212 has moved from storage node 134 to storage node 910, and shard 214 has moved from storage node 138 to storage node 910. In all examples described herein, shard metadata 325 is updated to reflect new replica storage locations due to movement of shards between storage nodes.

The shards are moved to node 910 over different (and substantially independent) node-to-node network connections (i.e., 132 to 910, 134 to 910 and 138 to 910). By copying one shard rather than three, nodes 132, 134 and 138 are respectively taxed much less than other implementations.

Figure 10A:
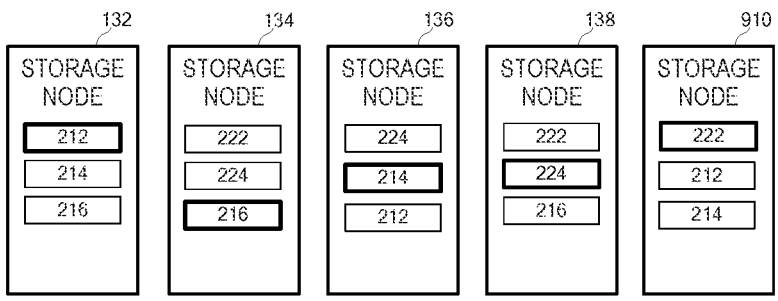
FIGS. 10a through 10c illustrate a scale-in process using database table shard replicas according to some embodiments.
Figure 10B:
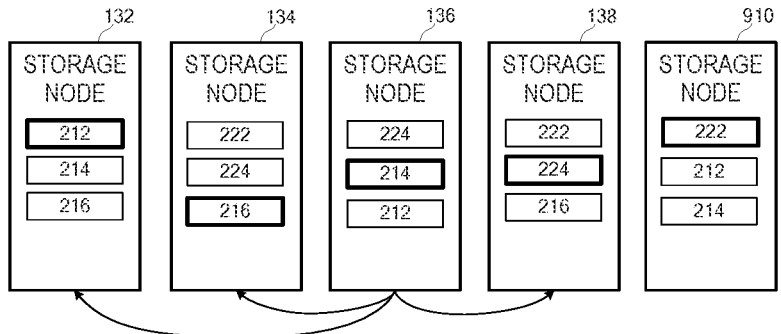
Figure 10C:
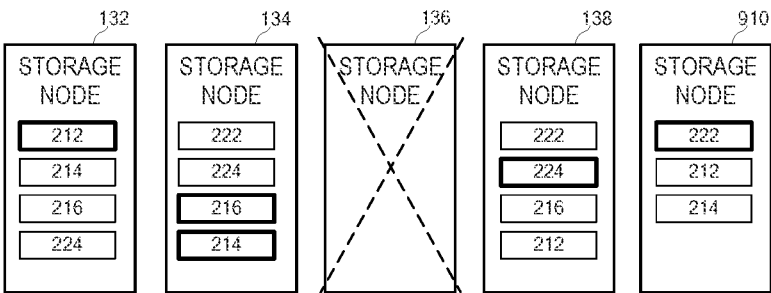

FIGS. 10a through 10c illustrate a scale-in process using database table shard replicas according to some embodiments. FIG. 10a reflects a storage layer as described with respect to FIG. 9c. It will be assumed that it is manually or automatically determined to decommission storage node 136, perhaps based on under-utilization of one or more storage nodes of the depicted storage layer.

FIG. 10b illustrates the movement of the shards of storage node 136 to storage nodes 132, 134 and 138. The shards to be moved and the storage nodes to which the shards are moved may be determined based on a load-balancing and/or resource consumption algorithm in some embodiments. FIG. 10c illustrates the resulting storage layer, in which shard 224 has moved from storage node 136 to storage node 132, shard 214 has moved from storage node 136 to storage node 134, and shard 212 has moved from storage node 136 to storage node 138. Since storage node 136 no longer stores any shards, it may be decommissioned. Shard metadata 325 is then updated to reflect new replica storage locations due to the above-described movement of shards between storage nodes.

Figure 11A:
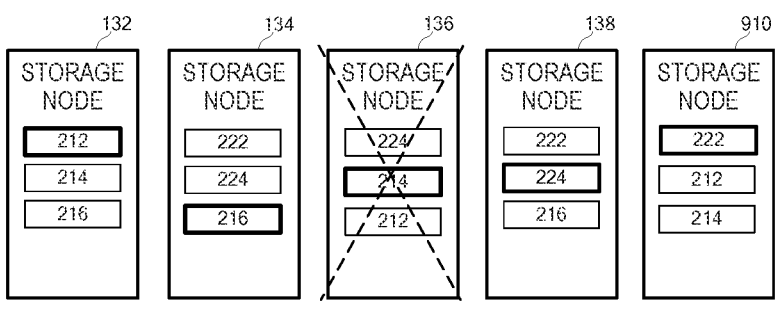
FIGS. 11a through 11c illustrate a recovery process using database table shard replicas according to some embodiments.
Figure 11B:
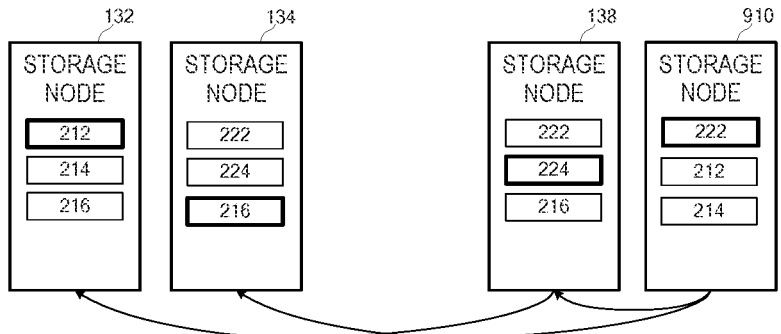
Figure 11C:
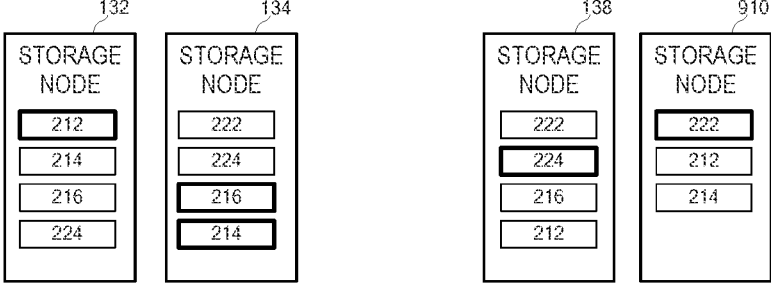

FIGS. 11a through 11c illustrate a recovery process using database table shard replicas according to some embodiments. FIG. 11a reflects a storage layer as described with respect to FIG. 10a, but in this case it is assumed that storage node 136 unexpectedly fails. In some implementations, decommissioning of node 136 may also proceed as described below with respect to FIGS. 11a-11c.

Upon detecting the failure, topology manager 320 accesses shard metadata 325 to determine the shards which were stored on storage node 136. Next, topology manager 320 identifies, based on shard metadata 325, which of the remaining storage nodes stores replicas of the shards which were stored on storage node 136. Topology manager 320 then instructs the storage layer to copy a replica of each of the shards which were stored on storage node 136 from a remaining storage node to a different remaining storage node.

FIG. 11b illustrates the copying of the replicas of each of the shards which were stored on failed storage node 136 to other storage nodes. For example, shard metadata 325 indicates that failed storage node 136 stored replicas of shards 224, 214 and 212, and that the replica of shard 214 was a leader replica. Shard metadata 325 also indicates that replicas of shard 224 are located on nodes 134 and 138, replicas of shard 214 are located on nodes 132 and 910, and replicas of shard 212 are located on nodes 132 and 910. Accordingly, FIG. 11b illustrates the copying of shard 224 from node 138 to node 132, of shard 214 from node 910 to node 134, and of shard 212 from node 910 to node 138. As noted above, copying between different sets of nodes allows each copy operation to proceed in parallel and to use the full available node-to-node bandwidth. FIG. 11c illustrates the resulting storage layer after completion of the copy operations.

The particular storage nodes from and to which the shards are copied may be determined based on a load-balancing and/or resource consumption algorithm according to some embodiments. Shard metadata 325 is updated to reflect the new replica storage locations. The update may also include election of the replica of shard 214 stored in node 134 as the leader replica, and indication of the election in shard metadata 325.

Figure 12:
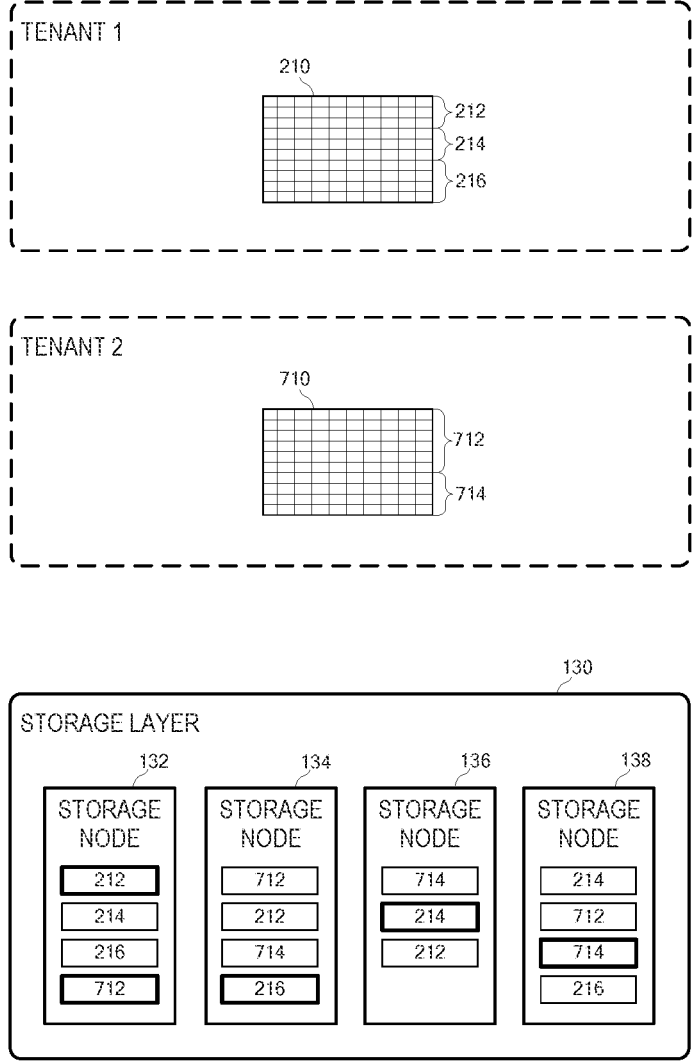
FIG. 12 illustrates storage of database table shard replicas of multiple tenants on a plurality of storage nodes according to some embodiments.

FIG. 12 illustrates storage of database table shard replicas of multiple tenants on a plurality of storage nodes according to some embodiments. Database table 210 includes data of Tenant 1 and database table 710 includes data of Tenant 2. Database table 210 conforms to a schema associated with Tenant 1 and database table 710 conforms to a schema associated with Tenant 2. Each tenant may be associated with many other database tables including their respective data. As is known in the art, the data of Tenant 1 is intended to be accessible only to users of Tenant 1 and the data of Tenant 2 is intended to be accessible only to users of Tenant 2.

In the illustrated example, table 210 is divided into shards 212, 214 and 216, and table 710 is divided into shards 712 and 714. Storage layer 130 stores multiple replicas of each of shards 212, 214, 216, 712 and 714 as described above with respect to FIG. 7. FIG. 12 represents a consensus protocol consisting of a leader replica (i.e., denoted by a pronounced outline) and two follower replicas for each shard. The replicas may be distributed across the storage nodes of storage layer 130 based on any suitable algorithm for providing load-balancing and high availability. Scale-out, scale-in, and failure recovery of the nodes shown in FIG. 12 may proceed in the manners described above with respect to FIGS. 9a-9c, 10a-10c and 11a-11c.

Figure 13:
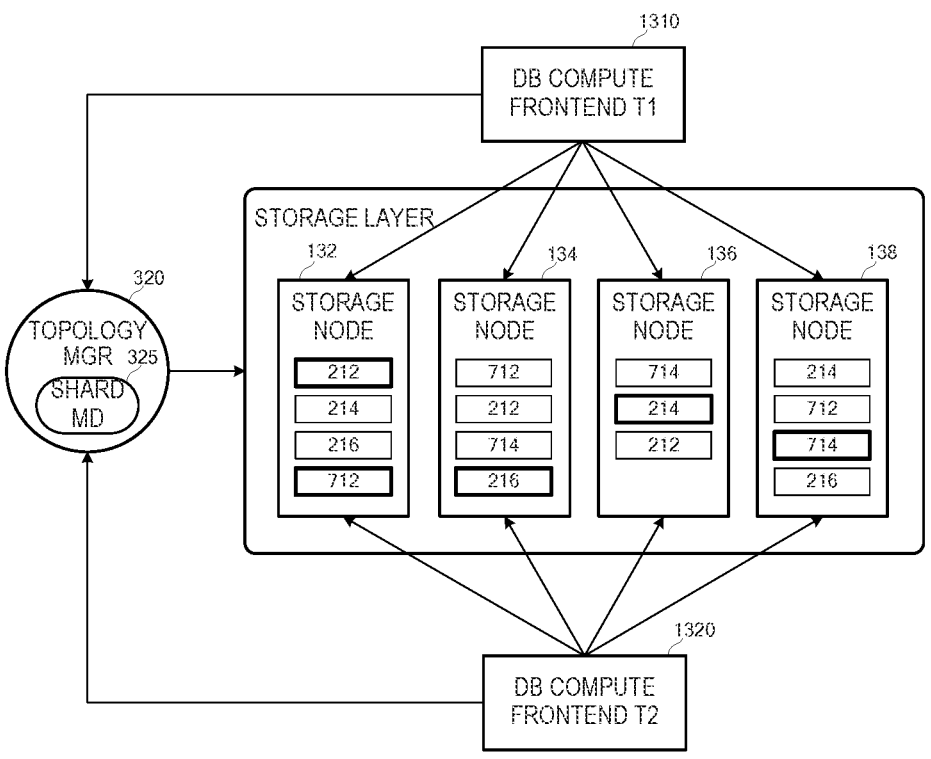
FIG. 13 illustrates access to database table shards of multiple tenants according to some embodiments.

FIG. 13 illustrates access to database table shards of multiple tenants according to some embodiments. Database compute frontend 1310 serves users of Tenant 1 and database compute frontend 1320 serves users of Tenant 2. Database compute frontend 1310 may comprise a single-tenant database instance executing on a single compute node of a compute layer, and database compute frontend 1320 may comprise a single-tenant database instance executing on another single compute node of the compute layer. In some embodiments, database compute frontend 1310 and database compute frontend 1320 execute on a same compute node.

Topology manager 320 may operate as described above. As also described above, shard metadata 325 may associate each shard with a table identifier, a key range, locations of each replica, and an identifier of a leader replica. However, since table 210 and table 710 conform to different schemas, table identifiers and key ranges of the tables of Tenant 1 might overlap/conflict with table identifiers and key ranges of the tables of Tenant 2. Accordingly, shard metadata 325 also associates each shard with a tenant identifier. If database compute frontends 1310 and 1320 are single-tenant database frontends, the tenant identifier may be an identifier of the container in which the frontends are executing.

In response to a received query, database compute frontend 1310 (or frontend 1320) queries topology manager 320 for the location of the shard(s) associated with the query. The query of topology manager 320 includes a tenant identifier, a table identifier, and a key range (e.g., as a concatenated string). Topology manager 320 determines an identifier of the storage node(s) in which the leader replicas of the desired shard(s) are stored based on the query received from database compute frontend 1310 (or frontend 1320) and shard metadata 325. Database compute frontend 1310 (or frontend 1320) then issues database operations to the node(s) on which the leader replicas shard(s) are stored. The storage nodes may perform these operations in parallel if the shards are located on more than one storage node.

In some embodiments, each tenant is associated with a root shard which includes the shard metadata for the tenant, and topology manager 320 stores a system control shard specifying the location of the root shard for each tenant. Database compute frontend 1310 or 1320 may therefore query topology manager 320 for the storage node which stores the root shard of a given tenant, read the metadata of the root shard from the storage node, and determine locations of desired shards based on the metadata. Each root shard may also be stored among storage nodes 132-138 in multiple replicas, in which case topology manager 320 stores the location of each replica of each root shard.

Some embodiments include a multi-tenant database compute frontend instance which executes on a compute node of the compute layer and serves users of Tenant 1 and users of Tenant 2. The multi-tenant database compute frontend accesses shard replicas as described above with respect to both database compute frontend 1310 and database compute frontend 1320, using an appropriate tenant identifier to query topology manager 320.

Figure 14:
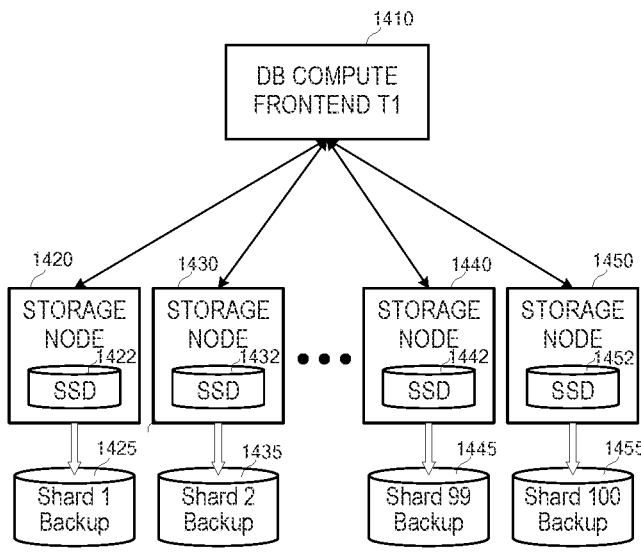
FIG. 14 illustrates storage of shard backups from a plurality of storage nodes to a plurality of backup locations according to some embodiments.

FIG. 14 illustrates storage of shard backups from a plurality of storage nodes to a plurality of backup locations according to some embodiments. Storage nodes 1420, 1430, 1440 and 1450 may store shards of one or more tenant databases. Each of storage nodes 1420, 1430, 1440 and 1450 may store zero or more shards of each of the one or more tenant databases. In some embodiments, each storage node 1420, 1430, 1440 and 1450 stores a respective single shard of a single tenant database.

Database compute frontend 1410 may serve users of a first tenant T1. Database compute frontend 1410 may request operations on shards of the first tenant's database which are stored in storage nodes 1420, 1430, 1440 and 1450 as described above. Another database compute frontend (unshown) may request operations on shards of another tenant's database which are stored in storage nodes 1420, 1430, 1440 and 1450. In some embodiments, a multi-tenant database compute frontend may request operations on any shards which are stored in storage nodes 1420, 1430, 1440 and 1450, regardless of the tenant database to which the shards belong.

From time-to-time during operation, and as is known in the art, storage nodes 1420, 1430, 1440 and 1450 store backup data of their respective shards into respective ones of backup locations 1425, 1435, 1445 and 1455. For each shard, the stored backup data may comprise a snapshot associated with a particular point in time and/or a snapshot associated with a particular point in time and corresponding logs as is known in the art. The backup data may comprise object data suitable for storage in backup locations 1425, 1435, 1445 and 1455, rather than block-based data. Embodiments are not limited to a one-to-one-to-one correspondence between storage nodes and shards.

Figure 15:
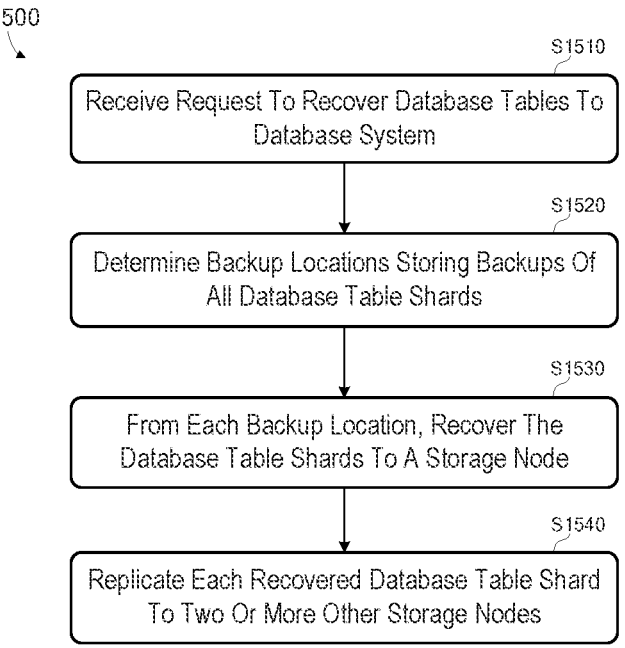
FIG. 15 is a flow diagram of a process to recover database tables of a database system according to some embodiments.

FIG. 15 is a flow diagram of process 1500 to recover shard backups stored in backup locations such as backup locations 1425, 1435, 1445 and 1455 according to some embodiments. Initially, at S1510, a request may be received to recover database tables to a database system. The request may be issued by an administrator in response to a region failure. According to this example, the received request may request recovery of backups of shards of a tenant of a database system operating in a first region to a tenant of a database system operating in a second region.

Figure 16:
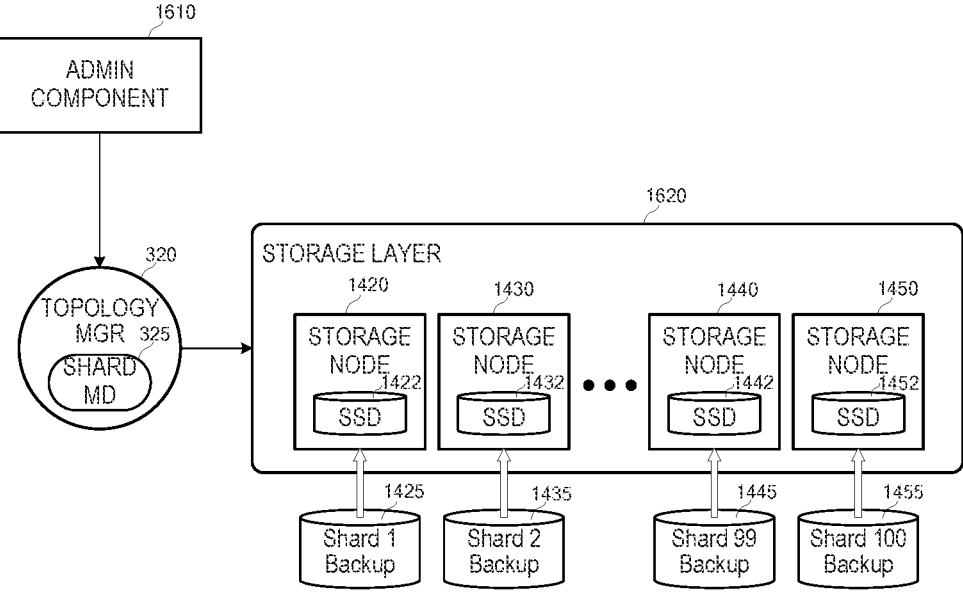
FIG. 16 illustrates recovery of database tables of a database system according to some embodiments.

FIG. 16 illustrates recovery of shard backups from backup locations to storage nodes according to some embodiments of process 1500. As will be described in more detail below, backup locations 1425, 1435, 1445 and 1455 are located in a second region and store backups of shards of a first tenant database of a database system which is located in a first region. The storage nodes of the database system which is located in the first region communicate with backup locations 1425, 1435, 1445 and 1455 over a WAN. Storage layer 1620 is located in a region different from the first region and may be located in a same or different region as backup locations 1425, 1435, 1445 and 1455.

An administrator may interact with a user interface of administrator component 1610 to cause administrator component 1610 to issue the request at S1510. In response, at S1520, topology manager 320 determines the backup locations which store backup data of each shard of each database table of the first (unshown) tenant. The determination may be based on shard metadata 325 and may require recovery of the backed-up system control shard of the first database system and the root shard of the first tenant. Next, topology manager 320 instructs storage layer 1620 to recover each shard from its corresponding backup location. Accordingly, at S1530, the database table shards are recovered from each of the determined backup locations to a storage node of storage layer 1620. Recovery of a shard may comprise storage of a corresponding snapshot in a storage node and replay of any corresponding logs. The particular storage node of storage layer 1620 to which a given shard is recovered may be determined by a load-balancing and/or other algorithms.

After S1530, a database compute frontend associated with the first tenant may access the recovered database table shards of the first tenant from storage layer 1620. The database compute frontend may be instantiated on a compute node located in a same region as storage layer 1620. Since storage layer 1620 may also store shards of databases of one or more other tenants, database compute frontends associated with those tenants may also execute on compute nodes of the same region to access those stored shards.

In some embodiments, each database table shard recovered on a given storage node is replicated to two or more other storage nodes at S1540. Such replication may occur before or after the recovered shards are made available for frontend consumption. Shard replication and management of the replicas during operation may proceed as described above.

FIG. 17 is a flow diagram of process 1700 to incrementally recover shard backups from backup locations to storage nodes according to some embodiments. At S1710, a request is received to recover database tables of a database to a database system. As mentioned with respect to S1510, the received request may request recovery of backups of shards of a tenant of a database system operating in a first region to a tenant of a database system operating in a second region.

Figure 18A:
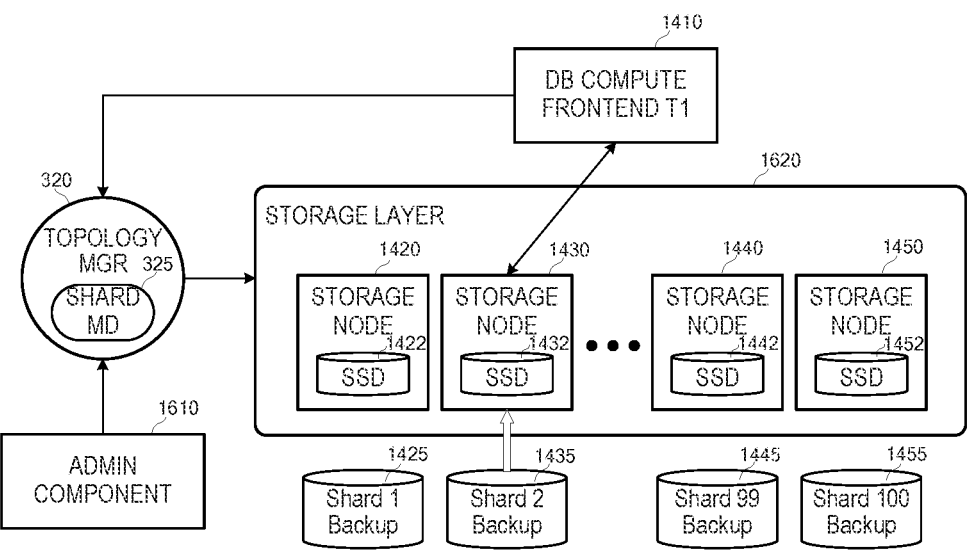
FIGS. 18a and 18b illustrate incremental recovery of database tables of a database system according to some embodiments.

FIG. 18a illustrates administrator component 1610 from which topology manager 320 receives the instruction to recover the database at S1710. Again, backup locations 1425, 1435, 1445 and 1455 are located in a second region and store backups of shards of a first tenant database of a database system which is located in a first region. Storage layer 1620 is associated with a second database system, stores data of one or more tenant databases, and is located in a region different from the first region.

Metadata defining shards of the database tables to recover is recovered at S1720. The recovery at S1720 may include recovery of a system control shard of the first database system and of a root shard of the first tenant from the backup locations into storage layer 1620. After S1720, the shards of the first tenant may be made accessible to database compute frontends. Notably, this access exists prior to the recovery of the shards into storage layer 1620. Accordingly, access to the database table shards of the first tenant may be re-established in a near-instantaneous manner after receipt of the request to recover the database tables at S1710.

Next, at S1730, a request is received for access to a shard of a database table. The request is received from database compute frontend 1410, which is instantiated on a compute node located in a same region as storage layer 1620. Database compute frontends associated with other tenants (including multi-tenant frontends) may also execute on compute nodes of the same region to access shards associated with those other tenants and stored in storage layer 1620.

As described above, the request may be received by topology manager 320. In response, topology manager 320 determines at S1740 and based on shard metadata 325 whether the shard has been recovered to storage layer 1620. If not, the shard is recovered at S1750 from the backup locations specified by the metadata of the root shard to a storage node, as illustrated in FIG. 18a by the arrow from backup location 1435 to storage node 1430. The root shard of the tenant is also updated to specify the storage node in which the shard is now stored.

At S1760, topology manager 320 provides an identifier of the storage node to the requestor. Continuing the present example of FIG. 18a, the requestor (e.g., frontend 1410) uses the identifier to communicate with storage node 1430 in order to request an operation on the shard. The operation is performed on the shard in the storage node at S1770. Flow returns to S1730 to await another request for shard access.

It will be assumed that a request to access the same shard is received at S1730. It is therefore determined at S1740 that the shard has already been recovered to storage node 1430 based on the root shard. Flow therefore proceeds to S1760 to provide an identifier of storage node 1430 to the requestor as described above. Accordingly, according to some embodiments, each shard of the database of the first tenant is recovered from a backup location only in response to a first request for access to the shard. A shard might never be recovered if no request for its access is received.

The request received at S1730 may request access to multiple shards of a database table and/or to other shards of several database tables. In such a case, S1740 through S1770 are performed in parallel for each shard of the request. Continuing the above example, a next request received at S1730 may request access to the first-requested shard and to another shard which has not yet been recovered. For the first-requested shard, flow proceeds to S1740, S1760 and S1770 to simply request an operation on the shard stored in storage node 1430 as illustrated in FIG. 18b.

Figure 18B:
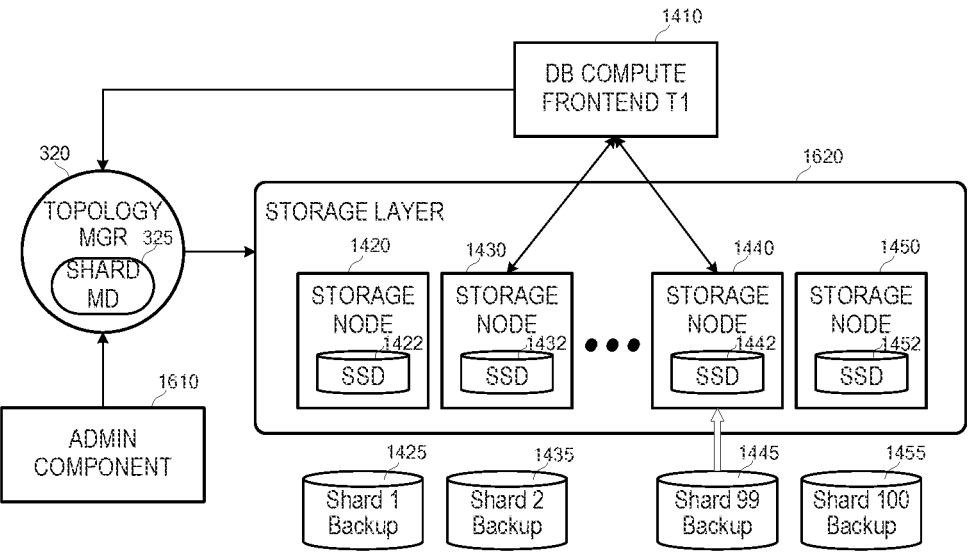

Assuming the backup data of the other shard of the request is stored in backup location 1445, flow proceeds from S1740 to S1750 to recover the shard to node 1440 as shown in FIG. 18b. Flow the continues to S1760 and S1770 to receive an identifier of storage node 1440 and to request an operation on the shard stored therein, as also illustrated in FIG. 18b.

Shards of the first tenant which are recovered to a respective storage node of storage layer 1620 according to process 1700 may be replicated to two or more other storage nodes to provide the benefits described above. This replication may occur in response to recovery of the shard, asynchronously, in batches of recovered shards, etc.

The foregoing descriptions of FIGS. 14 through 18b are applicable to multi-tenant architectures in which storage layer 1620 stores shards of database tables of two or more tenants. In such architectures, shard metadata 325 may specify, for each shard, a tenant, a database table, a key range, a storage node (if any), and a backup location ID.

Figure 19A:
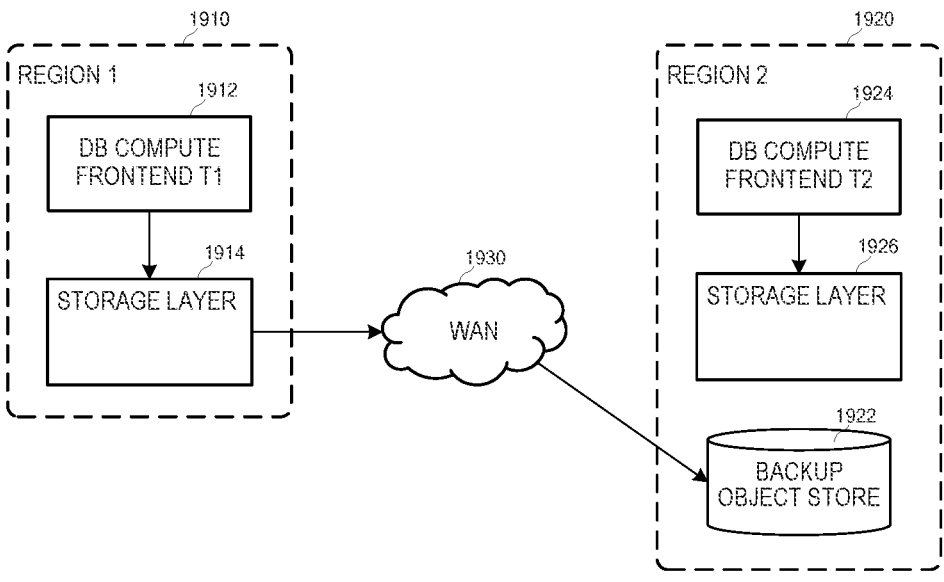
FIGS. 19a and 19b illustrate recovery of a database tenant from a first region to a second region after failure of the first region according to some embodiments.
Figure 19B:
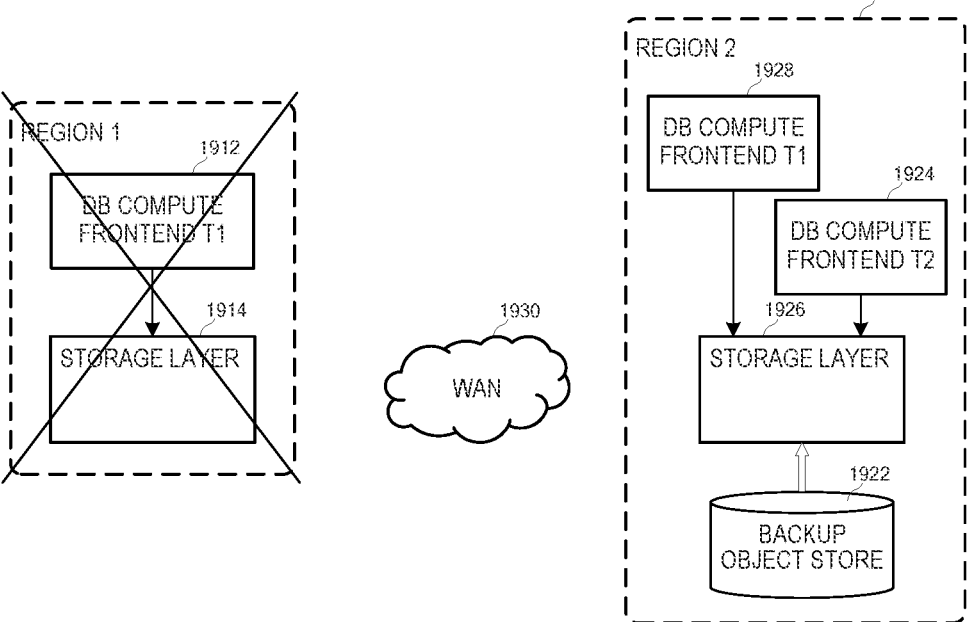

FIGS. 19a and 19b illustrate recovery of a database tenant from a first region to a second region after failure of the first region according to some embodiments. Region 1910 may comprise one or more Local Area Networks (LANs) including compute nodes of a compute layer and storage nodes of storage layer 1914 as described herein. Database compute frontend 1912 may comprise a single tenant instance executing on one or more compute nodes to serve users (not shown) of tenant T1. Accordingly, storage nodes of storage layer 1914 store shards of a database of tenant T1.

Storage nodes of storage layer 1914 may store shards of databases of one or more other tenants. The compute nodes of region 1910 may execute other single-tenant database compute frontend instances (and/or one or more multi-tenant database compute frontend instances) to serve users of these one or more other tenants.

During operation of database compute frontend 1912, the storage nodes of storage layer 1914 perform operations to backup their stored shards to a backup layer. In particular, each shard of the database of tenant T1 may be backed up periodically to a backup layer. As shown in FIG. 19a, the backup layer to which each shard of the database of tenant T1 is backed up is backup object store 1922 of region 1920. Region 1920 may comprise one or more LANs separate from the LANs of region 1910. As such, components of region 1910 communicate with components of region 1920 over WAN 1930. In some embodiments, region 1910 and region 1920 are located in different geographic regions (e.g., countries, continents).

Backup object store 1922 may comprise a plurality of backup locations as described above. Region 1920 also includes compute nodes of a compute layer and storage nodes of storage layer 1926. Database compute frontend 1924 may comprise a single tenant instance executing on one or more compute nodes to serve users (not shown) of tenant T2. As such, storage nodes of storage layer 1926 operate to store shards of a database of tenant T2. Backup locations of backup object store 1922 may also store backups of zero or more shards of the database of tenant T2 in some embodiments.

It will now be assumed that a disaster occurs in region 1910 which renders its computing resources inoperable, unavailable, or any combination thereof. This scenario is depicted in FIG. 19b. Notably, even though storage layer 1914 is no longer accessible, the backups of the shards of database tenant T1 are available within backup object store 1922 of region 1920.

Embodiments therefore operate to recover the shards of tenant T1 from backup object store 1922 into storage layer 1926 of region 1920. The recovery may be initiated by an administrator in response to detection of the failure of region 1910. The recovery may proceed as described above with respect to process 1500 or process 1700. It should be noted that, during and after such recovery, the database table shards of tenant T2 remain stored in storage layer 1926 and accessible to database compute frontend 1924.

In the former case, all of the database table shards of tenant T1 are identified from shard metadata stored in backup object store 1922. The metadata may specify a tenant, a database table, a key range and a backup location ID associated with each shard. The identified database table are then recovered from backup locations of backup object store 1922 to a plurality of storage nodes of storage layer 1926. Assuming a 1 GB/s connection between each storage node and each backup location, and depending on the size of shards backed up to a given backup location, the entire recovery process may be completed within seconds. Database compute frontend 1928 is then instantiated in a compute layer of region 1920 to serve queries of tenant T1. Next, incoming user queries associated with tenant T1 are directed to database compute frontend 1928.

Alternatively, according to the incremental recovery operation of process 1700, all of the database table shards of tenant T1 are identified from shard metadata stored in backup object store 1922 and the metadata defining the shards is recovered to storage layer 1922. Database compute frontend 1928 is then instantiated in a compute layer of region 1920 and incoming user queries associated with tenant T1 are directed to database compute frontend 1928. Since recovery of the metadata may occur in less than one second, the incoming user queries may be accepted almost instantaneously after receipt of the instruction to recover tenant T1.

Next, database compute frontend 1928 may receive a query which requires access to a shard of tenant T1. As described above, it is first determined whether the shard is available within storage layer 1926. If the shard is not available, the shard is recovered from the backup location of backup object store 1922 specified in the metadata and the metadata is updated to specify the storage node of storage layer 1926 in which the shard is now stored. An identifier of the storage node is provided to database compute frontend 1928, which uses the identifier to transmit a request to the storage node to perform an operation on the shard. Accordingly, using incremental recovery, shards of tenant T1 are recovered "on demand" to storage layer 1926 of region 1920.

Regardless of the type of recovery employed, database compute frontend 1928 may be instantiated using an existing compute node of the compute layer. Similarly, the recovered database table shards of tenant T1 may be stored in existing storage nodes of storage layer 1926. Consequently, fast recovery of tenant T1 from a region-wide disaster may be provided without requiring prior reservation of resources within region 1920.

Figure 20A:
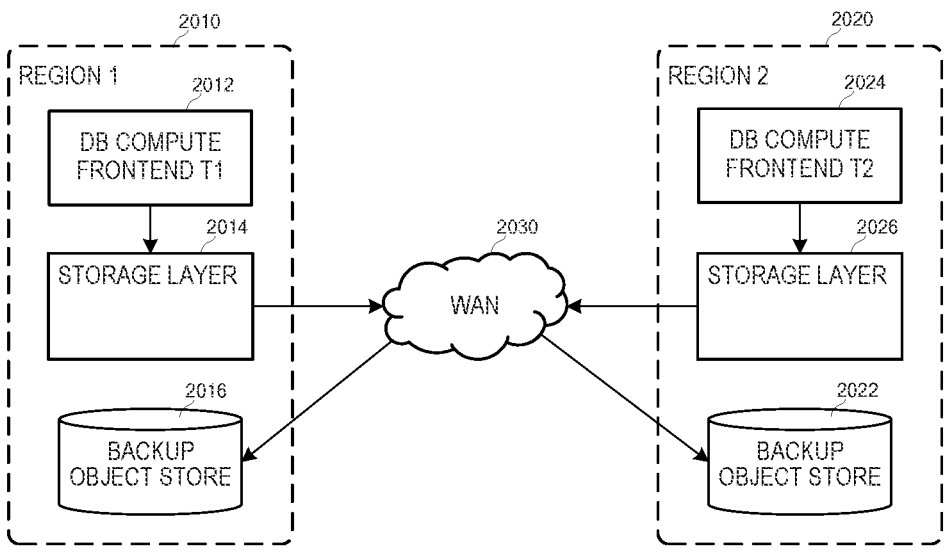
FIGS. 20a and 20b illustrate recovery of a database tenant from a second region to a first region after failure of the second region according to some embodiments.
Figure 20B:
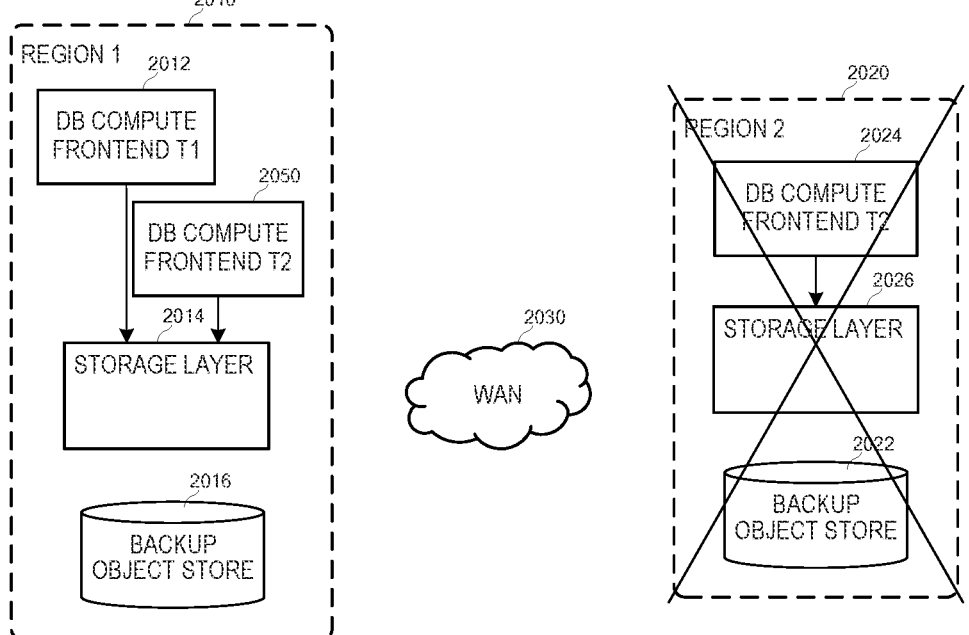

FIGS. 20a and 20b illustrate recovery of a database tenant from a second region to a first region after failure of the second region according to some embodiments. FIG. 20a illustrates a scenario in which each shard of the database of tenant T1 stored in storage layer 2014 of region 2010 is backed up periodically to backup object store 2022 of region 2020. Moreover, each shard of the database of tenant T2 stored in storage layer 2026 of region 2020 is backed up periodically to backup object store 2016 of region 2010. Due to the disparate regions in which they are located, storage layer 2014 communicates with backup object store 2022 over WAN 2030 and storage layer 2026 communicates with backup object store 2016 over WAN 2030.

It will now be assumed that a disaster occurs in region 2020 as depicted in FIG. 20b. An instruction is therefore received (e.g., from an administrator) to recover the shards of tenant T2 from backup object store 2016 into storage layer 2014 of region 2010. The recovered database table shards of tenant T2 may be stored in existing storage nodes of storage layer 2014. The recovery may proceed as described above with respect to process 1500 or process 1700. Such recovery does not disturb the database table shards of tenant T1 stored in storage layer 2014, which remain accessible to database compute frontend 2012.

Database compute frontend 2050 is then instantiated in a compute layer of region 2010 (e.g., using an existing compute node of the compute layer) to serve queries associated with tenant T2. Once the shards of tenant T2 are deemed accessible in storage layer 2014 (i.e., after recovery of all the shards to storage layer 2014, or after recovery of the tenant T2 metadata in the case of incremental recovery), incoming user queries associated with tenant T2 are directed to database compute frontend 2050.

Figure 21A:
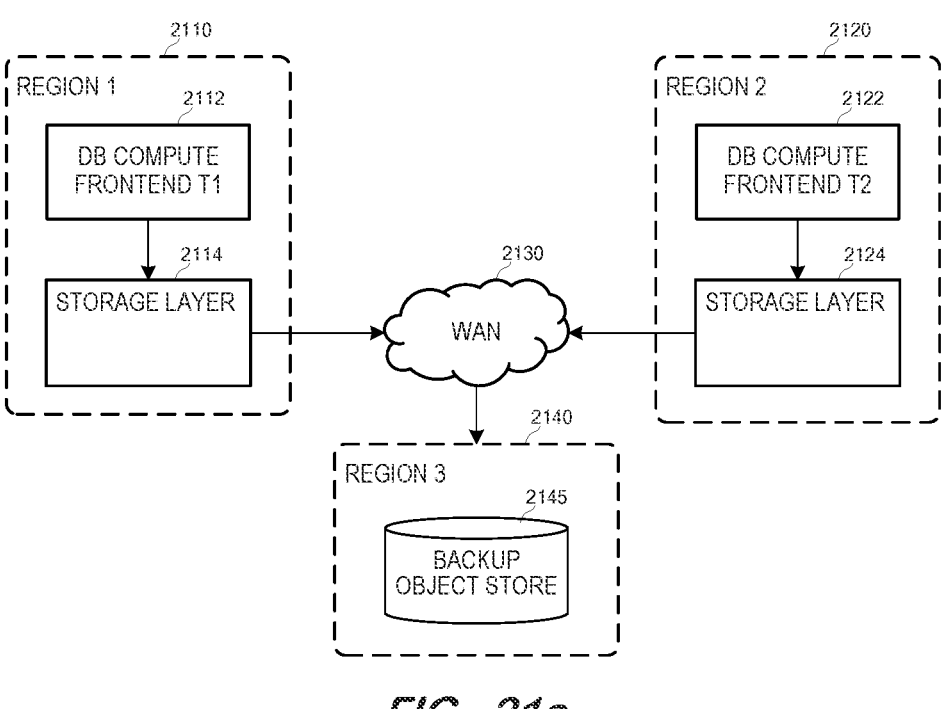
FIGS. 21a and 21b illustrate recovery of a database tenant from a first region to a second region after failure of the first region according to some embodiments.
Figure 21B:
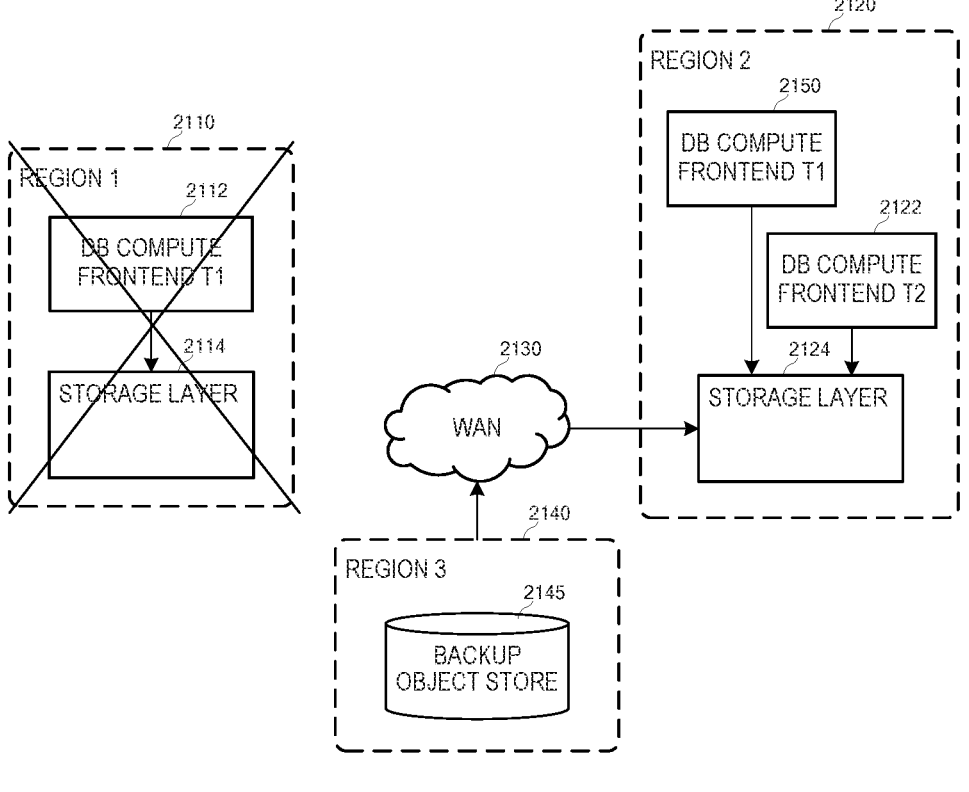

FIGS. 21a and 21b illustrate recovery of a database tenant from a first region to a second region after failure of the first region according to some embodiments. Each of regions 2110 and 2120 include a compute layer executing a database compute frontend (2112 and 2122, respectively) to serve incoming users requests based on shards of tenants T1 and T2 stored, respectively, in storage nodes of storage layer 2114 and storage layer 2124.

Region 2140 is separate from region 2110 and region 2120 and includes backup object store 2145. Storage layer 2114 communicates with backup object store 2145 over WAN 2130 to periodically store backup data of each shard of tenant T1 in backup locations of backup object store 2145. Similarly, storage layer 2124 communicates with backup object store 2145 over WAN 2130 to periodically store backup data of each shard of tenant T2 in backup locations of backup object store 2145.

If a disaster occurs in region 2110 as depicted in FIG. 21b, an instruction may be received to recover the shards of tenant T1 from backup object store 2145 into storage layer 2124 of region 2120. The database table shards of tenant T1 may be recovered to existing storage nodes of storage layer 2124. The recovery may proceed as described above with respect to process 1500 or process 1700 while the database table shards of tenant T2 stored in storage layer 2124 remain accessible to database compute frontend 2122. Database compute frontend 2150 is also shown instantiated in a compute layer of region 2120 to serve incoming queries associated with tenant T1.

It is noted that recovery of a shard from a backup object store located in a different region (i.e., region 2140) than the storage layer (i.e., region 2120) may proceed more slowly than a case where the backup object store and the storage layer are located in a same region (e.g., FIG. 19b and FIG. 20b). However, since the arrangement of FIGS. 21a and 21b decouples the shard backups from the database systems which use the shard backups, a failure of a region including a database system will not prevent database systems of other regions from accessing the shard backups. Moreover, the resources of the region including the backup object store may be scaled independently of the resources of regions which include compute and storage layers of a database system.

Figure 22A:
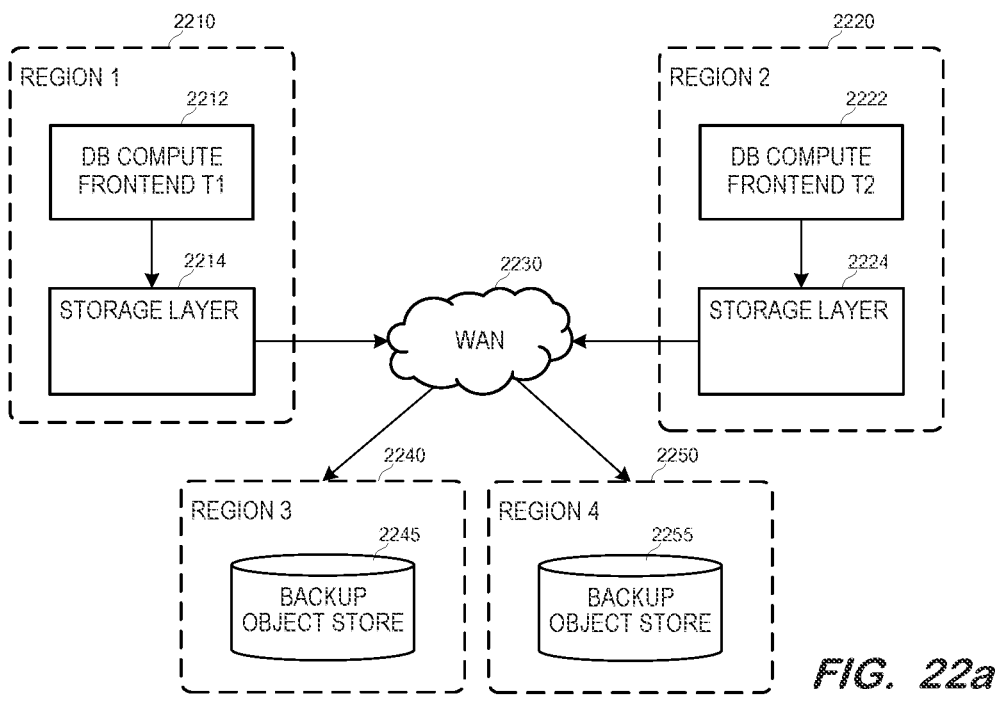
FIGS. 22*a* and 22*b* illustrate recovery of a database tenant from a first region to a second region after failure of the first region according to some embodiments.
Figure 22B:
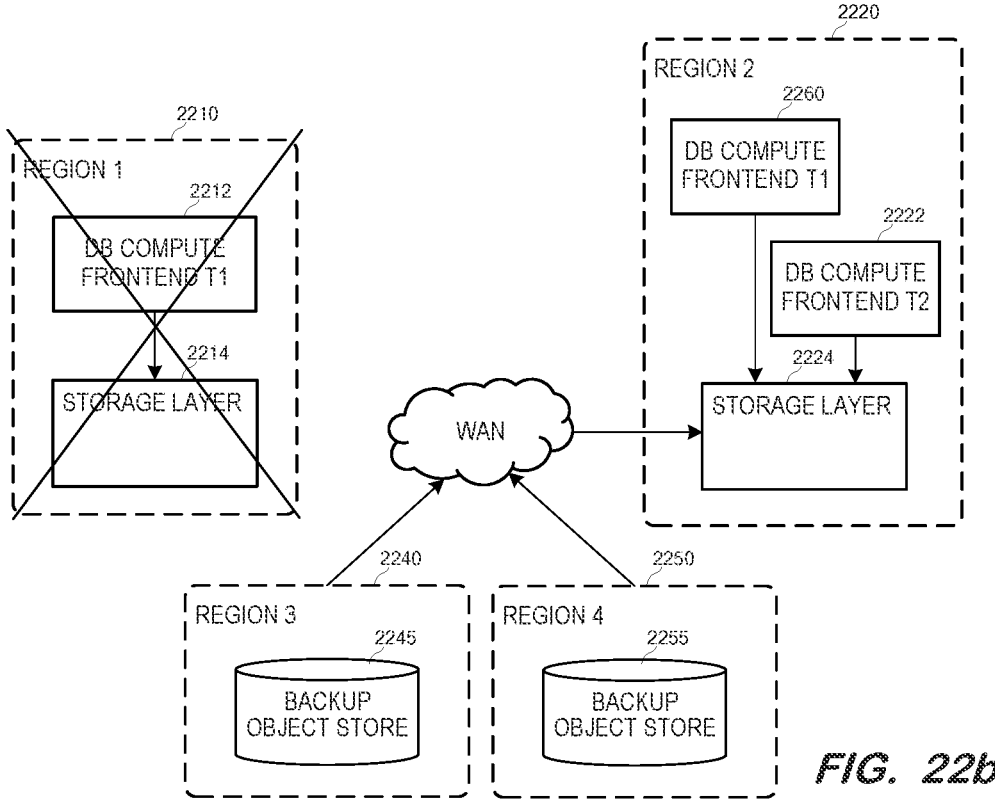

FIGS. 22a and 22b illustrate recovery of a database tenant from a first region to a second region after failure of the first region according to some embodiments. FIG. 22a is similar to FIG. 21a, except that storage layer 2214 of region 2210 communicates with backup object store 2245 of region 2240 and with backup object store 2255 of region 2250 over WAN 2230 to periodically store backup data of each shard of tenant T1 in backup locations of backup object store 2245 and of backup object store 2255. Storage layer 2224 also communicates with backup object store 2245 of region 2240 and with backup object store 2255 of region 2250 over WAN 2230 to periodically store backup data of each shard of tenant T2 in the backup locations of backup object store 2245 and of backup object store 2255. The use of two backup object stores in two different regions may provide additional robustness, in that a failure of region 2240 or region 2250 may be addressed by backing up all shards which were backed up to the failed region to a backup object store of another region.

FIG. 22b depicts a recovery from failure of region 2210. The recovery proceeds similarly to that shown in FIG. 21b, except that the database table shards of tenant T1 are recovered to existing storage nodes of storage layer 2124 from backup object store 2245 and backup object store 2255. The recovery may proceed as described above with respect to process 1500 or process 1700, again while the database table shards of tenant T2 stored in storage layer 2224 remain accessible to database compute frontend 2222. Database compute frontend 2260 is then instantiated in a compute layer of region 2220 to serve incoming queries associated with tenant T1.

Figure 23A:
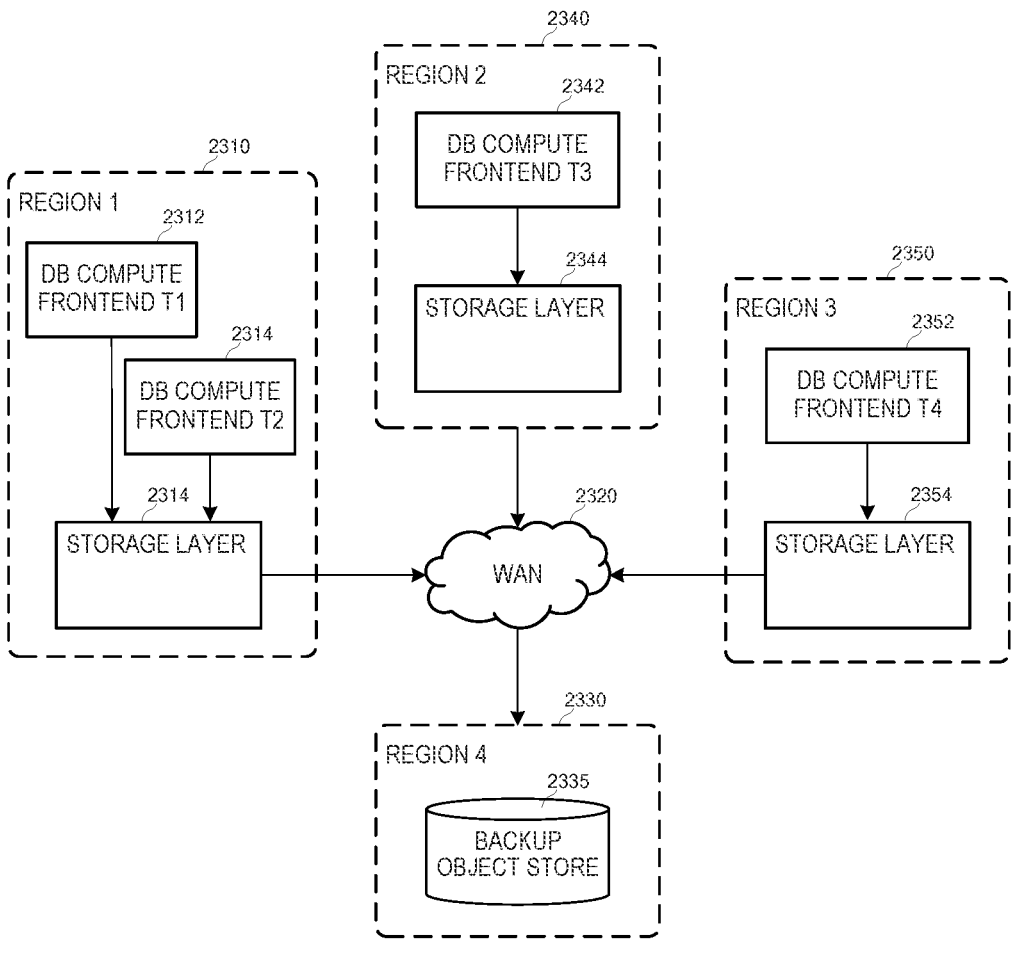
FIGS. 23*a* and 23*b* illustrate recovery of a first database tenant from a first region to a second region and a second database tenant from the first region to a third region after failure of the first region according to some embodiments.
Figure 23B:
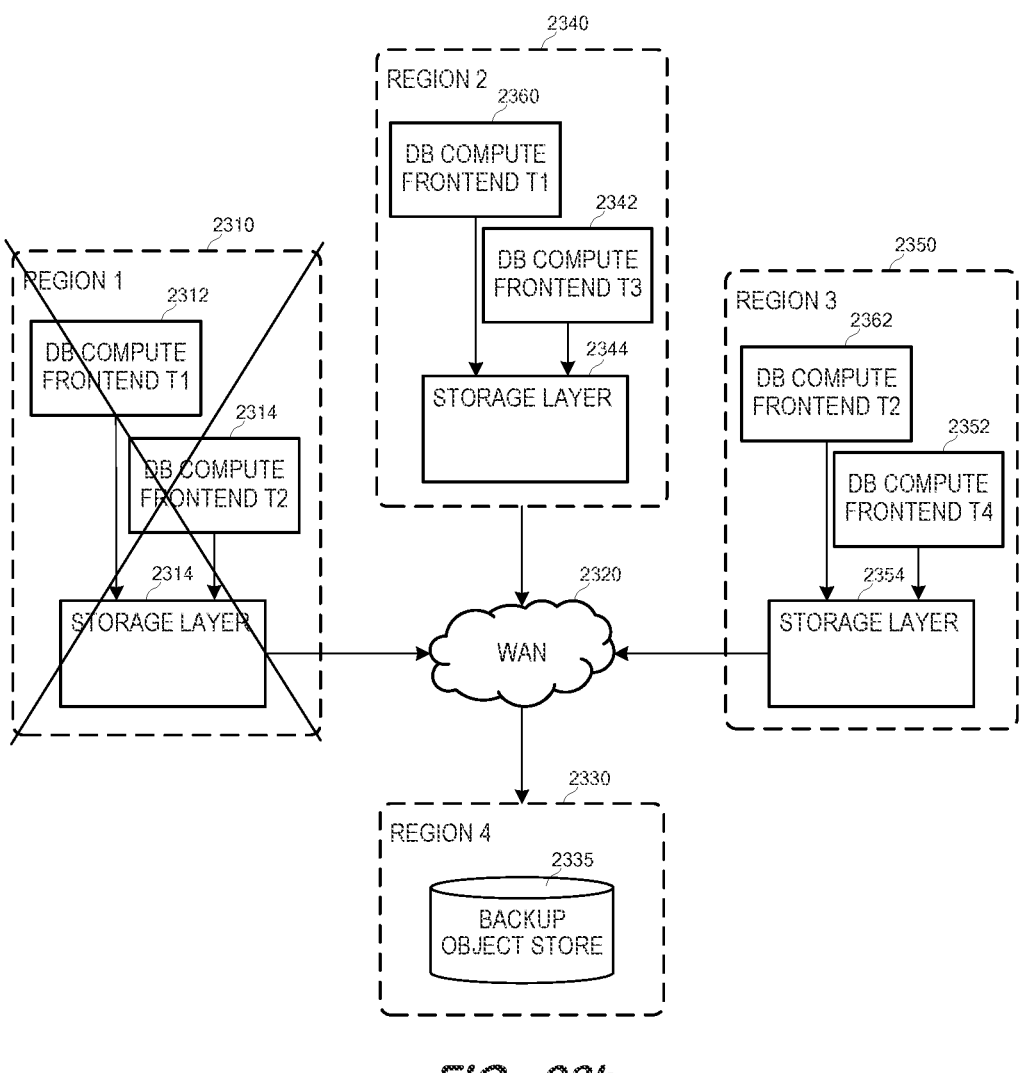

FIGS. 23a and 23b illustrate recovery of a first database tenant from a first region to a second region and a second database tenant from the first region to a third region after failure of the first region according to some embodiments. FIG. 23a shows region 2310 including storage layer 2314. Storage nodes of storage layer 2314 store shards of a database of tenant T1 and shards of a database of tenant T2. Database compute frontend 2312 executes in a compute layer of region 2310 to serve queries associated with tenant T1 from the corresponding shards stored in storage layer 2314 and database compute frontend 2314 executes in a compute layer of region 2310 to serve queries associated with tenant T2 from the corresponding shards stored in storage layer 2314.

Region 2340 includes storage layer 2344 storing shards of a database of tenant T3. Database compute frontend 2342 executes in a compute layer of region 2340 to serve queries associated with tenant T3 from the corresponding shards stored in storage layer 2344. Region 2350 includes storage layer 2354 storing shards of a database of tenant T4. Queries associated with tenant T4 are served by database compute frontend 2352 executing in a compute layer of region 2350 based on shards stored in storage layer 2354.

Region 2330 includes backup object store 2335. Each of storage layers 2314, 2344 and 2354 communicates with backup object store 2335 over WAN 2320 to periodically store backup data of each shard of their respective tenants T1, T2, T3 and T4 in backup locations of backup object store 2335.

FIG. 23b depicts a failure of region 2310. In response to the failure, the shards of tenant T1 are recovered from backup object store 2335 into storage layer 2344 of region 2340, and the shards of tenant T2 are recovered from backup object store 2335 into storage layer 2354 of region 2350. Database compute frontend 2360 is instantiated in a compute layer of region 2340 to serve queries associated with tenant T1 and database compute frontend 2362 is instantiated in a compute layer of region 2350 to serve queries associated with tenant T2. The database table shards of tenant T3 remain accessible to database compute frontend 2342 and the database table shards of tenant T4 remain accessible to database compute frontend 2352. Finally, incoming user queries associated with tenant T1 are directed to database compute frontend 2360 and incoming user queries associated with tenant T2 are directed to database compute frontend 2362. By distributing the workload from failed region 2310, the additional workload imposed on each of regions 2340 and 2350 is halved.

Figure 24:
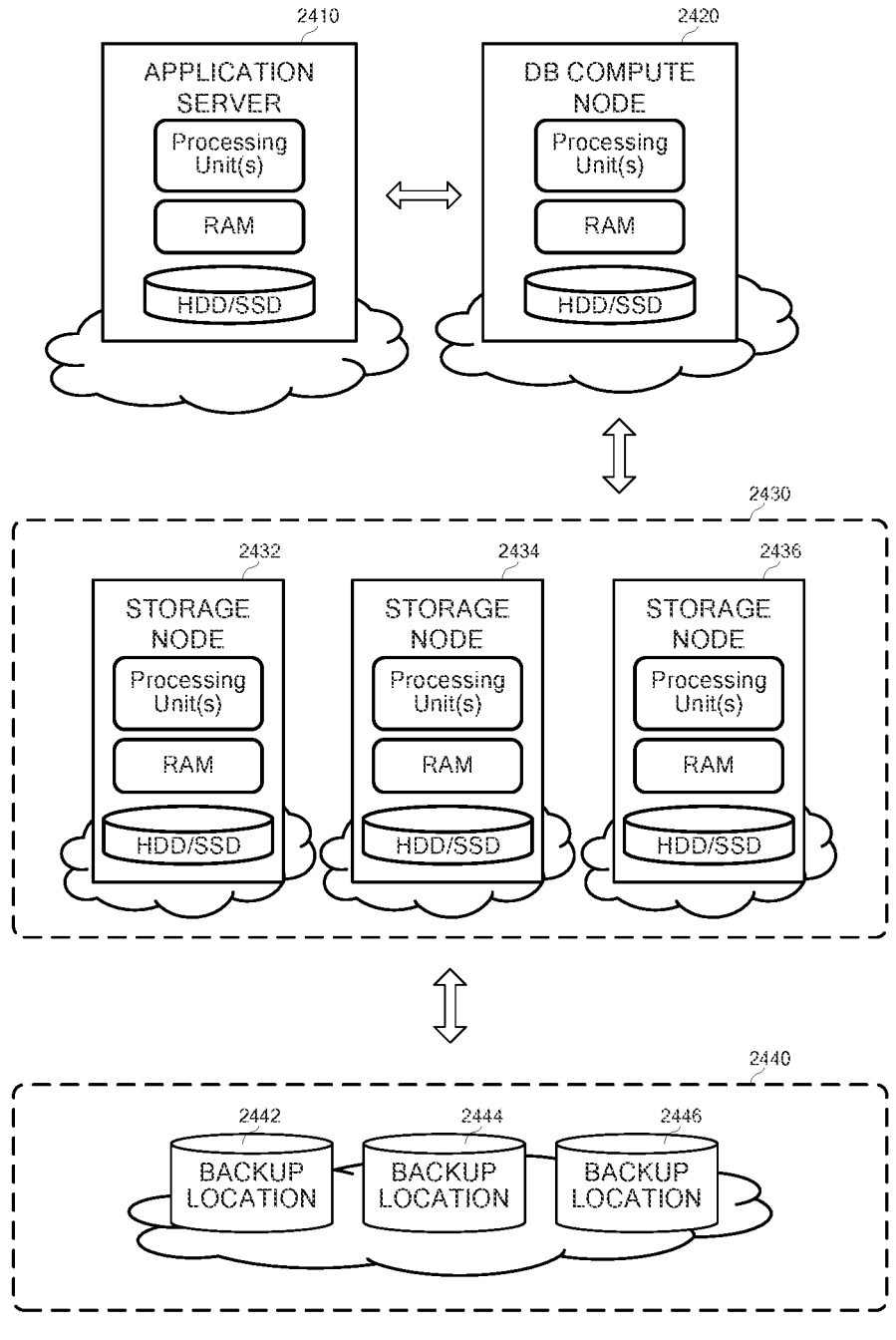
FIG. 24 is a block diagram of cloud-based virtual machines providing a database service according to some embodiments.

FIG. 24 is a block diagram of cloud-based environment according to some embodiments. Each component may be implemented using any suitable combination of hardware and software that is or becomes known. For example, each component may comprise a physical computer server or a virtual machine. Such virtual machines may reside in one or more public clouds providing self-service and immediate provisioning, autoscaling, security, compliance and identity management features.

Application server 2410 executes one or more applications which issue database queries. The applications may be accessed by users (not shown) who request information from the applications, thereby triggering issuance of the database queries. Application server 2410 transmits the queries to database compute node 2420, which executes a database instance (e.g., an indexserver). Based on the queries, the database instance instructs CRUD operations on data stored in storage nodes 2432, 2434 and 2436 of storage layer 2430.

The data is stored in storage nodes 2432, 2434 and 2436 of storage layer 2430 in any manner described above. For example, the data of a given table may be stored in shards distributed throughout storage nodes 2432, 2434 and 2436, and each shard may be replicated across multiple storage nodes. The data may include data of more than one tenant, where each shard of a given tenant is identified in metadata by a tenant identifier, a table identifier and a key range. Database compute node 2420 uses the metadata to determine the locations of shards on which operations are desired.

The shard data stored in storage nodes 2432, 2434 and 2436 of storage layer 2430 is backed up to backup locations 2442, 2444 and 2446 of backup layer 2440. Backup layer 2440 may be located in a region different from the region of compute node 2420 and storage layer 2430. In case of a failure of the region including compute node 2420 and storage layer 2430, the backed up shard data of backup locations 2442, 2444 and 2446 may be recovered to storage nodes of a storage layer located in another region to allow access to the shard data as described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a first storage layer comprising a first plurality of storage nodes located in a first region, the first plurality of storage nodes storing shards of first database tables of a first tenant, each shard associated with a first database table and a key range of the first database table;
a first plurality of compute nodes located in the first region to receive first queries of the first tenant and to access the shards of the first database tables in the first plurality of storage nodes in response to the first queries;
a second storage layer comprising a second plurality of storage nodes located in a second region, the second plurality of storage nodes storing shards of second database tables of a second tenant and no shards of the first database tables of the first tenant, each shard of the second database tables associated with a second database table and a key range of the second database table;
a second plurality of compute nodes located in the second region to receive second queries of the second tenant and to access the shards of the second database tables in the second plurality of storage nodes in response to the second queries; and
a backup layer comprising a plurality of backup locations located in a region different from the first region, the plurality of backup locations storing backups of the shards of the first database tables of the first tenant, wherein, in response to a failure of the first region which occurs while the second plurality of storage nodes store shards of the second database tables of a second tenant and no shards of the first database tables of the first tenant, the backups of the shards of the first database tables of the first tenant are recovered from the backup layer to the second plurality of storage nodes, third queries of the first tenant are directed to the second plurality of compute nodes located in the second region, and the second plurality of compute nodes access the shards of the first database tables recovered to the second plurality of storage nodes in response to the third queries.

2. A system according to claim 1, the second plurality of compute nodes executing a database compute frontend to access the shards of the second database tables stored in the second plurality of storage nodes, wherein, in response to the failure of the first region, a second database compute frontend is instantiated in at least one of the second plurality of compute nodes to access the shards of the first database tables recovered to the second plurality of storage nodes.

3. A system according to claim 2, wherein the backups of the shards of the first database tables of the first tenant are recovered from the backup layer to the second plurality of storage nodes in parallel.

4. A system according to claim 2, wherein the backups of the shards of the first database tables of the first tenant are recovered from the backup layer to the second plurality of storage nodes incrementally and on demand.

5. A system according to claim 1, the second plurality of compute nodes executing a multi-tenant database compute frontend to access the shards of the second database tables stored in the second plurality of storage nodes, wherein, in response to the failure of the first region, the multi-tenant database compute frontend accesses the shards of the first database tables recovered to the second plurality of storage nodes.

6. A system according to claim 1, wherein the backups of the shards of the first database tables of the first tenant are recovered from the backup layer to the second plurality of storage nodes in parallel.

7. A system according to claim 1, wherein the backups of the shards of the first database tables of the first tenant are recovered from the backup layer to the second plurality of storage nodes incrementally and on demand.

8. A computer-implemented method comprising:

storing shards of first database tables of a first tenant in a first plurality of storage nodes located in a first region, each shard of the first database tables associated with a first database table and a key range of the first database table;

receiving first queries of the first tenant at a first plurality of compute nodes located in the first region and accessing the shards of the first database tables in the first plurality of storage nodes in response to the first queries;

storing shards of second database tables of a second tenant in a second plurality of storage nodes located in a second region, each shard of the second database tables associated with a second database table and a key range of the second database table, and the second plurality of storage nodes storing no shards of the first database tables of the first tenant;

receiving second queries of the second tenant at a second plurality of compute nodes located in the second region and accessing the shards of the second database tables in the second plurality of storage nodes in response to the second queries;

storing backups of the shards of the first database tables of the first tenant in a plurality of backup locations located in a region different from the first region;

in response to a failure of the first region which occurs while the second plurality of storage nodes store shards of the second database tables of a second tenant and no shards of the first database tables of the first tenant, recovering the backups of the shards of the first database tables of the first tenant from the plurality of backup locations to the second plurality of storage nodes; and receiving third queries of the first tenant at the second plurality of compute nodes located in the second region and accessing the shards of the first database tables recovered to the second plurality of storage nodes in response to the third queries.

9. A method according to claim 8, further comprising:

accessing the shards of the second database tables stored in the second plurality of storage nodes with a database compute frontend executing on at least one of the second plurality of compute nodes located in the second region; and instantiating a second database compute frontend on at least one of the second plurality of compute nodes located in the second region to access the shards of the first database tables recovered to the second plurality of storage nodes.

10. A method according to claim 9, wherein the backups of the shards of the first database tables of the first tenant are recovered from the backup layer to the second plurality of storage nodes in parallel.

11. A method according to claim 9, wherein the backups of the shards of the first database tables of the first tenant are recovered from the backup layer to the second plurality of storage nodes incrementally and on demand.

12. A method according to claim 8, further comprising:

executing a multi-tenant database compute frontend on the second plurality of compute nodes located in the second region to access the shards of the second database tables stored in the second plurality of storage nodes, and to access the shards of the first database tables recovered to the second plurality of storage nodes.

13. A method according to claim 8, wherein the backups of the shards of the first database tables of the first tenant are recovered from the backup layer to the second plurality of storage nodes in parallel.

14. A method according to claim 8, wherein the backups of the shards of the first database tables of the first tenant are recovered from the backup layer to the second plurality of storage nodes incrementally and on demand.

15. A non-transitory computer-readable medium storing program code, the program code executable by a computing system to:

store shards of first database tables of a first tenant in a first plurality of storage nodes located in a first region, each shard of the first database tables associated with a first database table and a key range of the first database table;

receive first queries of the first tenant at a first plurality of compute nodes located in the first region and accessing the shards of the first database tables in the first plurality of storage nodes in response to the first queries;

store shards of second database tables of a second tenant in a second plurality of storage nodes located in a second region, each shard of the second database tables associated with a second database table and a key range of the second database table, and the second plurality of storage nodes storing no shards of the first database tables of the first tenant;

receiving second queries of the second tenant at a second plurality of compute nodes located in the second region and accessing the shards of the second database tables in the second plurality of storage nodes in response to the second queries;

store backups of the shards of the first database tables of the first tenant in a plurality of backup locations located in a region different from the first region;

in response to a failure of the first region which occurs while the second plurality of storage nodes store shards of the second database tables of a second tenant and no shards of the first database tables of the first tenant, recover the backups of the shards of the first database tables of the first tenant from the plurality of backup locations to the second plurality of storage nodes, and receive third queries of the first tenant at the second plurality of compute nodes located in the second region and accessing the shards of the first database tables recovered to the second plurality of storage nodes in response to the third queries.

16. A medium according to claim 15, the program code executable by a computing system to:

access the shards of the second database tables stored in the second plurality of storage nodes with a database compute frontend executing on at least one of the second plurality of compute nodes located in the second region; and instantiate a second database compute frontend on at least one of the second plurality of compute nodes located in the second region to access the shards of the first database tables recovered to the second plurality of storage nodes.

17. A medium according to claim 16, wherein the backups of the shards of the first database tables of the first tenant are recovered from the backup layer to the second plurality of storage nodes in parallel.

18. A medium according to claim 16, wherein the backups of the shards of the first database tables of the first tenant are recovered from the backup layer to the second plurality of storage nodes incrementally and on demand.

19. A medium according to claim 15, the program code executable by a computing system to:

execute a multi-tenant database compute frontend on the second plurality of compute nodes located in the second region to access the shards of the second database tables stored in the second plurality of storage nodes, and to access the shards of the first database tables recovered to the second plurality of storage nodes.

20. A medium according to claim 15, wherein the backups of the shards of the first database tables of the first tenant are recovered from the backup layer to the second plurality of storage nodes incrementally and on demand.

* * * * *